US012456255B2

(12) United States Patent
Vannahme et al.

(10) Patent No.: US 12,456,255 B2
(45) Date of Patent: Oct. 28, 2025

(54) SYSTEM AND METHOD FOR GENERATING DIGITAL THREE-DIMENSIONAL DENTAL MODELS

(71) Applicant: 3SHAPE A/S, Copenhagen K (DK)

(72) Inventors: Christoph Vannahme, Holte (DK); Anders Gaarde, Søborg (DK); Anders Robert Jellinggaard, Copenhagen K (DK); Bárdur Ísleifsson, Copenhagen S (DK); Stavroula Michou, Copenhagen SV (DK); Mathias Schärfe Lambach, Frederiksberg (DK)

(73) Assignee: 3SHAPE A/S, Kobenhavn K (DK)

( * ) Notice: Subject to any disclaimer, the term of this patent is extended or adjusted under 35 U.S.C. 154(b) by 452 days.

(21) Appl. No.: 17/437,896

(22) PCT Filed: Mar. 11, 2020

(86) PCT No.: PCT/EP2020/056499
§ 371 (c)(1),
(2) Date: Sep. 10, 2021

(87) PCT Pub. No.: WO2020/182880
PCT Pub. Date: Sep. 17, 2020

(65) Prior Publication Data
US 2022/0148263 A1    May 12, 2022

(30) Foreign Application Priority Data
Mar. 11, 2019  (DK) .......................... PA 2019 70159

(51) Int. Cl.
*G06T 17/20*    (2006.01)
*G06T 7/00*    (2017.01)
(Continued)

(52) U.S. Cl.
CPC ............. *G06T 17/20* (2013.01); *G06T 7/0016* (2013.01); *G06T 7/11* (2017.01); *G06T 7/174* (2017.01);
(Continued)

(58) Field of Classification Search
CPC ..... G06T 19/006; G06T 17/20; G06T 7/0016; G06T 7/40; G06T 7/136; G06T 7/174;
(Continued)

(56) References Cited

U.S. PATENT DOCUMENTS

| 8,363,912 | B2 | 1/2013 | Thoms |
| 9,870,613 | B2 | 1/2018 | Wu et al. |

(Continued)

FOREIGN PATENT DOCUMENTS

| CN | 104780830 A | 7/2015 |
| CN | 105832291 A | 8/2016 |

(Continued)

OTHER PUBLICATIONS

International Search Report (PCT/ISA/210) and Written Opinion (PCT/ISA/237) mailed on Jul. 16, 2020, by the European Patent Office as the International Searching Authority for International Application No. PCT/EP2020/056499.

(Continued)

*Primary Examiner* — Chante E Harrison
(74) *Attorney, Agent, or Firm* — BUCHANAN INGERSOLL & ROONEY PC

(57) ABSTRACT

According to an embodiment, a method for generating a digital three-dimensional model representing development in dental condition for a tooth is disclosed. The method includes obtaining, at different timepoints, a first digital 3D model of a patient's set of teeth including first texture data and a second digital 3D model of the patient's set of teeth including second texture data. The first digital 3D model (Continued)

including the first texture data and second digital 3D model including the second texture data are placed in a common texture space by uniformizing texture. Lastly, the digital three-dimensional model representing development in dental condition is generated based on a comparison of the first texture data and the second texture data of corresponding regions in the first digital 3D model and the second digital 3D model placed in the common texture space.

22 Claims, 13 Drawing Sheets

(51) Int. Cl.
  *G06T 7/11* (2017.01)
  *G06T 7/174* (2017.01)
  *G06T 7/40* (2017.01)
(52) U.S. Cl.
  CPC ...... *G06T 7/40* (2013.01); *G06T 2207/10024* (2013.01); *G06T 2207/10064* (2013.01); *G06T 2207/30036* (2013.01)
(58) Field of Classification Search
  CPC . G06T 2207/10024; G06T 2207/10064; G06T 2207/30036; G06T 5/50; G06T 15/04; G06T 7/11; G06T 2200/04; A61B 5/0088; G06G 7/016; G06V 40/10
  See application file for complete search history.

(56) References Cited

U.S. PATENT DOCUMENTS

| | | | |
|---|---|---|---|
| 10,410,346 | B2 | 9/2019 | Somasundaram et al. |
| 11,147,652 | B2* | 10/2021 | Mason .................... G16Z 99/00 |
| 11,707,238 | B2* | 7/2023 | Moshe .................. A61B 6/465 |
| | | | 433/29 |
| 2009/0185712 | A1 | 7/2009 | Wong et al. |
| 2016/0125601 | A1* | 5/2016 | Wu ........................ H04N 23/56 |
| | | | 382/128 |
| 2016/0135925 | A1 | 5/2016 | Mason et al. |
| 2018/0028064 | A1 | 2/2018 | Elbaz et al. |
| 2018/0028065 | A1* | 2/2018 | Elbaz .................. H04N 13/271 |
| 2018/0357766 | A1 | 12/2018 | Van Der Poel et al. |
| 2020/0360109 | A1* | 11/2020 | Gao ...................... G06T 7/0012 |
| 2022/0189611 | A1* | 6/2022 | Farkash ................ A61B 1/0684 |
| 2022/0202295 | A1* | 6/2022 | Elbaz .................... A61B 5/7267 |
| 2023/0118333 | A1* | 4/2023 | Bundsgaard ......... A61B 5/6898 |
| | | | 433/29 |
| 2024/0115196 | A1* | 4/2024 | Moshe ................ A61B 5/0088 |
| 2024/0164874 | A1* | 5/2024 | Lipnik ................ A61C 9/0053 |

FOREIGN PATENT DOCUMENTS

| | | | | |
|---|---|---|---|---|
| CN | 106470595 | A | | 3/2017 |
| CN | 108062792 | A | | 5/2018 |
| CN | 108242056 | A * | 7/2018 | ............ G06T 5/002 |
| CN | 109069237 | A | | 12/2018 |
| EP | 1614378 | A1 | | 1/2006 |
| EP | 2083389 | A2 | | 7/2009 |
| EP | 3050534 | A1 | | 8/2016 |
| JP | 2004313783 | A | | 11/2004 |
| KR | 20180090308 | A | | 8/2018 |
| WO | WO-2012107069 | A1 * | 8/2012 | ............ A61C 19/04 |
| WO | 2014000745 | A1 | | 1/2014 |
| WO | 2017093563 | A1 | | 6/2017 |
| WO | 2017144647 | A1 | | 8/2017 |
| WO | 2017207454 | A1 | | 12/2017 |
| WO | 2018152374 | A1 | | 8/2018 |

OTHER PUBLICATIONS

A. Jablonski-Momeni et al "Use of ICDAS-II, Fluorescence-Based Methods, and Radiography in Detection and Treatment Decision of Occlusal Caries Lesions: An In Vitro Study", International Journal of Dentistry, 2012, vol. 2012, No. 371595. (9 pages).
First Office Action issued on Jun. 12, 2024, by the Chinese Patent Office in corresponding Chinese Patent Application No. 202080035006.6, and an English Translation of the Office Action. (23 pages).
Office Action issued on Jun. 27, 2024, by the Korean Patent Office in corresponding Korean Patent Application No. 10-2021-7032371, and an English Translation of the Office Action. (11 pages).
Office Action (Communication) issued on Sep. 11, 2024, by the European Patent Office in corresponding European Patent Application No. 20 711 849.8. (7 pages).
Office Action issued on Sep. 6, 2024, by the Chinese Patent Office in corresponding Chinese Patent Application No. 202080035006.6, and an English Translation of the Office Action. (6 pages).

* cited by examiner

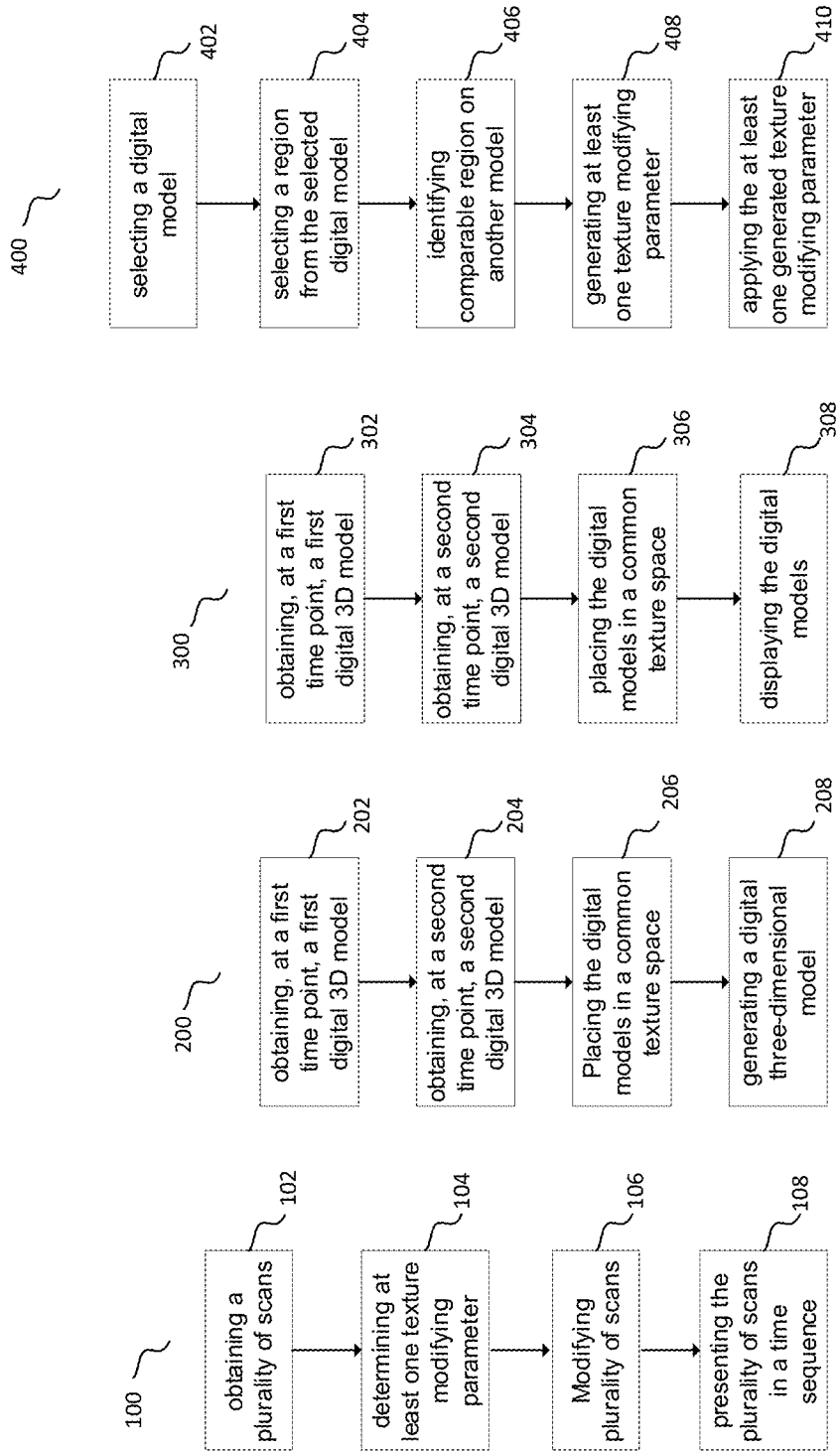

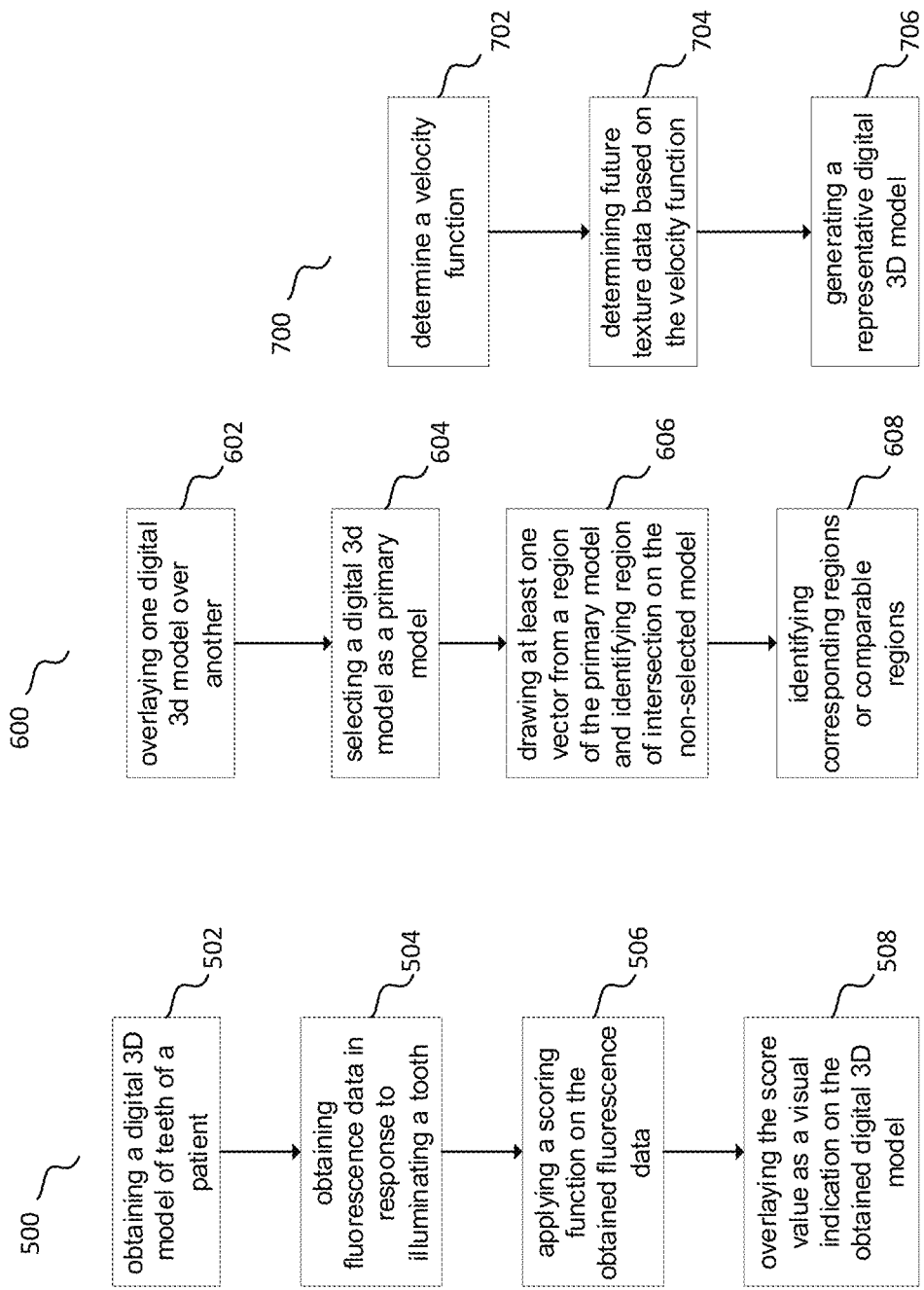

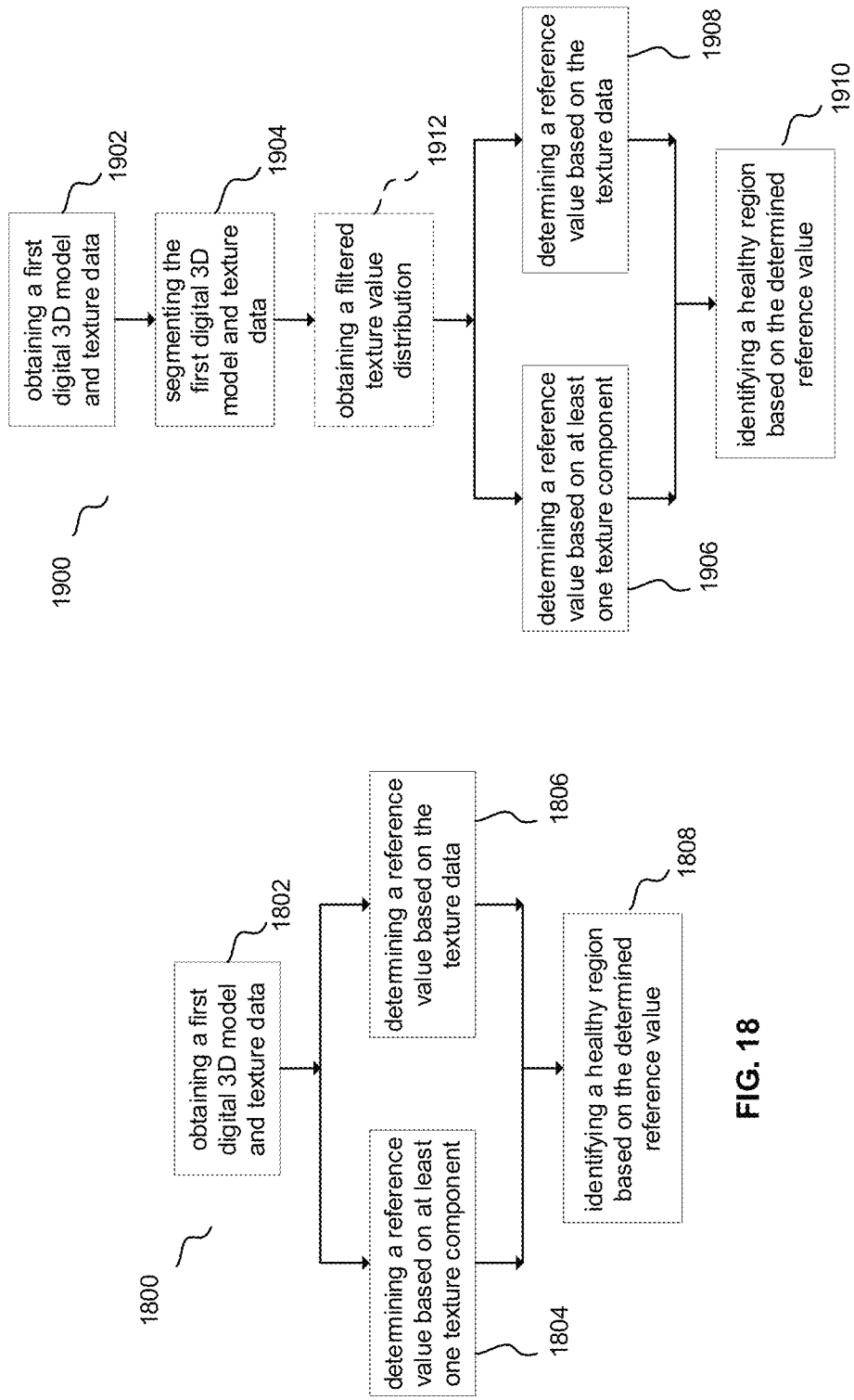

SYSTEM AND METHOD FOR GENERATING DIGITAL THREE-DIMENSIONAL DENTAL MODELS

TECHNICAL FIELD

The disclosure relates to a system and method for generating a digital three-dimensional dental model. In particular, the disclosure relates to uniformizing texture among a plurality of digital three-dimensional dental models. The disclosure further relates to generating a digital three-dimensional model(s) representing dental conditions or development of dental conditions, such as caries, fluorosis, gingivitis for a patient. Furthermore, the disclosure relates to identifying healthy region in a digital 3D model of patient's teeth.

BACKGROUND

Dental diseases usually progress with time, and in absence of proper care may lead to irreversible situations that may even lead to extraction of diseased tooth. Therefore, an early detection and monitoring of development of dental condition is desirable. This would allow for timely undertaking preventive or corrective measures.

For example, dental condition such as dental caries, which is also referred to as tooth decay or cavities, is one of the most common and widespread persistent diseases today and is also one of the most preventable.

Typically, dental caries may be spotted as occlusal caries, which form on the top-most part of the tooth where food particles repeatedly come in direct contact with the teeth. It's in this location where bacteria fester and pose a risk to one's oral hygiene. If the teeth and surrounding areas are not cared for properly, the bacteria will begin to digest the sugars left over from food in the mouth and convert it into acids as a waste product. These acids may be strong enough to demineralize the enamel on one's teeth and form tiny holes—the first stage of dental caries. As the enamel begins to break down, the tooth loses the ability to reinforce the calcium and phosphate structures of the teeth naturally through saliva properties and, in time, acid penetrates the tooth and destroys it from the inside out.

Despite the impact tooth decay may have on one's teeth if left unattended, dental caries or cavities are largely preventable with a good oral hygiene regimen. This includes regular dental checkups. The dentist typically looks at the teeth and may probe them with a tool called an explorer to look for pits or areas of damage. The problem with these methods is that they often fail to identify cavities when these cavities are just forming. Occasionally, if too much force is used, an explorer may puncture the porous enamel. This could cause formation of irreversible cavity formation and allow the cavity-causing bacteria to spread to healthy teeth.

Caries that has destroyed enamel cannot be reversed. Most caries will continue to get worse and go deeper. With time, the tooth may decay down to the root which will cause severe discomfort for the patient if not treated. How long this takes varies from person to person and the general level of oral hygiene.

Caries caught in the very early stages can be reversed. White spots may indicate early caries that has created a porous structure in the enamel. In early stages of caries development, tooth decay may be stopped. It may even be reversed as the material dissolved in the enable might be replaced. Fluorides and other prevention methods also help a tooth in early stages of decay to repair itself (remineralize).

Brown/black spots are the last stage of early caries. Once caries gets worse the porous tooth structure may collapse creating irreversible cavities in the enamel, hence only the dentist can repair the tooth. Then the standard treatment for a cavity is to fill the tooth with fillings typically made of dental amalgam or composite resin. Sometimes bacteria may infect the pulp inside the tooth even if the part of the tooth one may see remains relatively intact. In this case, the tooth typically requires root canal treatment or even extraction of the damaged tooth.

It may be observed that development of caries is a process where dental caries may be easily treated if detected early. If undetected and untreated, caries may progress through the outer enamel layer of a tooth into the softer dentin so far as to require extraction of the tooth or to cause inflammation of periodontal tissue surrounding the tooth.

Therefore, a need exists for providing a solution for allowing a professional such as a dentist to detect preferably early in the process and monitor development of dental condition, such as caries in patient's teeth.

SUMMARY

According to an embodiment, a method for generating a virtual three-dimensional model representing a dental condition at a region is disclosed. The method includes obtaining a first digital 3D model of a patient's set of teeth and region-specific texture data corresponding to different regions of the first digital 3D model, the texture data comprising fluorescence data and color data. Thereafter, a region containing the dental condition is identified. This is based on an identification value satisfying an identification threshold criterion, wherein the identification value is calculated by applying an identification function on the texture data associated with the region of the first digital 3D model. Once the region containing the dental condition is identified, a severity value is determined for at least one region that has been identified as the region containing the dental condition. This is performed by applying a severity function on at least one of the texture data associated with the identified region. Lastly, the virtual three-dimensional model comprising a visual indicator based on the determined severity value for the region containing the dental condition such as caries is generated. The disclosed method is a computer implemented method.

According to an embodiment, a computer implemented method to identify a healthy dental region is disclosed. The method includes obtaining a digital 3D model of a patient's set of teeth and region-specific texture data corresponding to different regions of the digital 3D model, the texture data comprising at least one of fluorescence data or color data. In one embodiment, for at least one texture component of the obtained texture data, a reference value based on texture value distribution relating to the at least one texture component of the texture data is determined, and a region having respective value of texture component corresponding to the at least one texture component within a certain range of the determined reference value are determined as the healthy region. Alternatively, for the texture data, a reference value based on texture value distribution relating to the texture data is determined, and identifying regions having texture value within a defined range of the determined reference value as the healthy region. The disclosed computer method may be implemented as an automatic method.

The texture value distribution may relate to texture value of the texture data or value derived therefrom such as from a specific channel of the texture data, the texture value relating to a region of a morphological entity such as a specific tooth or jaw as a whole.

According to an embodiment, a computer program product embodied in a non-transitory computer readable medium is disclosed. The computer program product comprising computer readable program code is executable by a hardware data processor to cause the hardware data processor to execute a method to identify a healthy dental region. The method includes obtaining a digital 3D model of a patient's set of teeth and region-specific texture data corresponding to different regions of the digital 3D model, the texture data comprising at least one of fluorescence data or color data. In one embodiment, for at least one texture component of the obtained texture data, a reference value based on texture value distribution relating to the at least one texture component of the texture data is determined, and a region having respective value of texture component corresponding to the at least one texture component within a certain range of the determined reference value is identified as the healthy region. Alternatively, for the texture data, a reference value based on texture value distribution relating to the texture data is determined, and a region having texture value within a defined range of the determined reference value is identified as the healthy region. In an embodiment, the computer program product comprising computer readable program code is executable by a hardware data processor to cause the hardware data processor to execute the disclosed method to automatically identify a healthy dental region.

According to an embodiment, a method of generating a digital three-dimensional model representing development in dental condition for a tooth is disclosed. The method includes obtaining, at a first time point, a first digital 3D model of a patient's set of teeth and region-specific texture data comprising fluorescence data and color data corresponding to different regions of the first digital 3D model. A severity value, associated with a level of severity of the dental condition, for at least one region identified as a region of the first digital 3D model containing the dental condition is determined by applying a severity function on at least one of the texture data associated with the identified region. Similarly, at a second time point later than the first time point, a second digital 3D model of the patient's set of teeth and region-specific texture data comprising fluorescence data and color data corresponding to different regions of the second digital 3D model is obtained. A severity value, associated with a level of severity of the dental condition, for at least one region identified as a region of the first digital 3D model containing the dental condition is determined by applying a severity function on at least one of the texture data associated with the identified region. A set of severity differences between the severity values for corresponding regions between the first digital 3D model and the second digital 3D model are determined. Lastly, a digital 3D model comprising the set of severity differences is generated. The disclosed method is a computer implemented method.

According to an embodiment, a method for generating 3D graphical models of an oral situation of a patient over time is disclosed. The method includes obtaining a plurality of scans, each scan representing the oral situation of the patient at a specific time, and where each scan comprises texture data; determining at least one texture modifying parameter, and presenting the plurality of scans in a time sequence wherein the texture of at least one, preferably each, of the respective plurality of scans has been modified based on the one of the at least one texture modifying parameter. The disclosed method is a computer implemented method.

According to an embodiment, a method for generating a digital three-dimensional (3D) model representing development in dental condition such as dental condition, such as caries for a tooth is disclosed. The method includes obtaining, at a first time point, a first digital 3D model of a patient's set of teeth including first texture data; obtaining, at a second time point, a second digital 3D model of the patient's set of teeth including second texture data; placing the first digital 3D model including the first texture data and second digital 3D model including the second texture data in a common texture space by uniformizing texture; and generating the digital three-dimensional model representing development in dental condition based on a comparison of the first texture data and the second texture data of corresponding regions in the first digital 3D model and the second digital 3D model with the texture data placed in the common texture space. The disclosed method is a computer implemented method.

According to an embodiment, a method for generating digital three-dimensional (3D) models is disclosed. The method includes
   obtaining, at a first time point, a first digital 3D model of a patient's set of teeth including first texture data;
   obtaining, at a second time point, a second digital 3D model of the patient's set of teeth including second texture data;
   placing the first digital 3D model including the first texture data and second digital 3D model including the second texture data in a common texture space by uniformizing texture; and
   displaying, on a display unit, the first digital 3D model including the first texture data and second digital 3D model including the second texture data with the texture data placed in the common texture space.

The scans may typically be presented as a digital 3D model of patient's oral situation such as the first digital 3D model or second digital 3D model. The oral situation may include at least one of teeth, gingiva, soft tissue, or other foreign objects like implant, pontic, etc. Typically, the oral situation includes patient's teeth, preferably with patient's gingiva. In some embodiments, patient's gingiva may be removed from teeth after applying a segmentation technique followed by morphing of gingiva comprising a standard model gingiva or artificially generated gingiva with the teeth.

Modifying the plurality of scans based on the one of the at least one texture modifying parameter may include applying the one of the at least one texture modifying parameter on the texture data relating to the scan.

The plurality of scans, with or without application of the texture modifying parameter, may be arranged in the time sequence in accordance with time stamps associated with when each scan was taken. The time sequence may be represented as a time line having multiple time point entries. In an embodiment, selecting a specific time point renders related scan as a digital 3D model on a display. In another embodiment, the user may select more than one time points and more than one scans, as digital 3D models, relating to individually selected time points may be displayed simultaneously, such as on a dual display (discussed later).

In the embodiments, where the texture of the plurality of scans is modified, the texture represented in the plurality of scans are presented along a time sequence with the texture data in a common texture space. This allows for a user-friendly visualization of scans and reliable monitoring of the oral situation because the focus of the dental professional is not diverted by variations in texture across the plurality of scans and the scans gets processed (e.g. compared) consistently irrespective of the variations under which the scans were acquired.

The term color may refer to combination of values of Red, Green, and Blue channels or any other representation of color as a combination of values of different color channels, such as representation in different color spaces. The colors may be presented in different color spaces or converted from one color space to another, such as from a device dependent color space like RGB color space to a device independent color space like CIELAB color space and vice versa. Color Space is typically defined as a three-dimensional, numerical scheme in which each and every humanly perceivable color may typically have a unique coordinate. For example, LAB is a color space defined by the CIE in 1976 to simulate various aspects of human visual performance.

The method may further include displaying the generated digital 3D model representing development in dental condition such as caries on a display unit. In an embodiment, prior to comparison of the first texture data and second texture data, the first digital 3D model and second digital 3D model are segmented, i.e. individual dental objects like tooth, sub-tooth information, or gingiva are segmented and identified as separate dental objects.

In different embodiments of the disclose, the digital 3D models may also include 3D representation of the oral situation include patient's set of teeth.

The disclosure and various embodiments is described in relation to a specific dental condition, i.e. caries as an example. However, the method disclosed herein may be employed in relation to other dental conditions as well. The skilled person would appreciate that depending upon the dental condition, different parts of oral situation may be utilized for visualization and comparison. For example, for gingivitis, the relevant oral situation would utilize patient's gingiva.

The term "based on a comparison of the first texture data and second texture data" includes two scenarios: a) direct comparison of first texture data and second texture data, and b) indirect comparison of first texture data and second texture data, for example by applying a function such as a scoring function, or severity function on the texture data (discussed later).

The region in the disclosure may refer to at least to the smallest entity that defines a digital 3D model. For example, if the digital 3D model is represented as a polygonal mesh, then the region may refer to a facet or may even refer to a vertex. Alternatively, the region may refer to a voxel if the digital 3D model comprises voxels. In some embodiments, the region may also include a collection of regions, i.e. a plurality of smallest entities grouped together, such that any of the disclosed method or its steps is performed on the collection of regions rather than only on the smallest entity. Thus, the collection of regions may be defined by the edges of the outermost facet. In another embodiment, the region may include an underlying mesh defined by edges, vertices, faces corresponding to a surficial portion of the model the processor automatically identifies (e.g. based on segmentation) or with user input (e.g. marking of a surficial portion using a tool available in the user interface). In an event, a comparison between texture data of digital 3D models that are represented differently is needed, then the method may further include transforming at least one the digital 3D models in same representation as the other representation(s) prior to any processing such as comparison. For example, if one digital 3D model is represented as a polygonal mesh and another one in voxels, then at least one of the digital 3D models may be transformed in one of the polygonal mesh representations, voxel representations or any other representations such that all models that need to be compared or presented are in same representation.

In any of the above disclosed embodiments, the first digital 3D model and the second digital 3D model may be presented in a side-by-side manner on a dual display or in a superimposed manner over one another. The dual display may be understood to include at least two physically different display units or a single display unit having its display area split into at least two display sections such as display tiles. The term side-by-side manner may be understood to include displaying the two digital models in any of a horizontal layout, vertical layout or inclined layout such as a diagonal layout where each of the first digital 3D model and second digital 3D model is individually displayed from same viewpoint (for example occlusal view or lingual view, etc.) on the dual display. Representing the models in this manner may allow quick visualization and evaluation of same perspective of different digital 3D models with respective texture data.

During visualization in a side-by-side manner or in a timeline, the method may further include, typically based on user input, a) linking the at least two digital 3D models, and/or b) delinking the different digital 3D models. In the former scenario a), the method may further include, receiving a user model movement instruction for moving the models comprising at least one of translation, zooming, panning and/or rotation of models. In response to the model movement instruction, the linked models are simultaneously moved by at least substantially the same amount and in the same direction. The user instructions may be received by a button such as a directional/rotational/panning/zooming button in a user interface and/or by interacting with one of the models such as by selecting a model and moving the selected model using a mouse. In the latter scenario b), the method may further include, receiving a user instruction for moving comprising at least one of translation, zooming, panning, and/or rotating the models. Unlike scenario a); in scenario b), only the 3D model that is selected prior to receiving the instruction undergoes the movement.

Obtaining the first digital 3D model with the region-specific color data may be achieved by intraoral scanning of patient's teeth using an intraoral color scanner. Similarly, an intraoral scanner configured to excite fluorescent material of the tooth to obtain the first digital 3D model with the region-specific fluorescence data. The fluorescence data may be obtained through the red pixel and green pixel of RGB sensor of the scanner. Thus, the texture data may include five texture components namely RGB channels from the color data and RG channels from the fluorescence data. The intraoral scanning also allows for obtaining topological information, i.e. three dimensional data including teeth arrangement, of patient's teeth. Further description is included below.

In different embodiments, the texture data may include color data and/or fluorescence data. The color data may be obtained by scanning patient's tooth using a scanner system such as an intra oral scanner capable of recording tooth colors. Such scanning allows for detecting and monitoring changes in color of teeth between the two scans acquired at different timepoints. Such scanning typically also captures topological information of patient's teeth and may be used to generate the first digital 3D model and second digital 3D model. The fluorescence data may be obtained by scanning patient tooth using a scanner system such as an intra oral scanner capable of exciting fluorescent material of the tooth, and in response receiving a fluorescent signal comprising RGB components. Such acquisition of fluorescence data at different timepoints allows for detecting and monitoring changes in fluorescence data relating to the teeth, especially fluorescent data from cariogenic regions of a tooth, between the two scans. In order to obtain the fluorescence data, the fluorescent signal received from the tooth in response to exciting a fluorescent material of the tooth is preferably passed through a filter to at least substantially remove one or more color components from the fluorescent signal and retaining only the other non-removed components (e.g. removing the blue component from the fluorescent signal but retaining Red and Green components). Thus, the blue component may be filtered out such that the fluorescent data is obtained through the red pixel and green pixel of the RGB sensor. In an embodiment, the generation of the first digital 3D model and second digital 3D model is based on the topological information of patient's teeth collected during the acquisition of fluorescence data. Alternatively, the generation of the first digital 3D model and second digital 3D model is based on the topological information of patient's teeth collected during the acquisition of the color data, for example, using topological information obtained when patient's teeth are illuminated using an illumination light that is also used in acquisition of the color data. In this situation, respective fluorescence data may be overlaid over the generated first digital 3D model and second digital 3D model, which may include or is devoid of the color data. In an embodiment, the first digital 3D model and second digital 3D model that are devoid of texture data may be obtained either by scanning a gypsum model of patient's teeth or by removing color data from the digital 3D model comprising the color data and obtained by scanning of the patient's teeth using the intraoral scanner. As regards measuring fluorescence, a reference to the U.S. application Ser. No. 14/411,160 titled "3D Intraoral scanner measuring fluorescence" is provided, the disclosure of which are incorporated here by reference.

In an embodiment, a digital 3D model based on the topological information of an intraoral cavity is generated based on light reflected from surfaces of the intraoral cavity. When a surface of the intraoral cavity is illuminated with an illumination light from a light source of a 3D scanner system such as the intraoral scanner, the light reflected from the surface within a field of view is detected by an image sensor of the 3D scanner system. Based on the reflected light, the data processing unit may compute a sub-scan for the region of the surface arranged within the field of view. A series of sub-scans may be computed when e.g. a handheld part of the 3D scanner system is moved relative to the intraoral cavity such that different regions of the surface are arranged in the field of view. The digital 3d model of the intraoral cavity surface/set of teeth may be generated by stitching said sub-scans. Such 3D scanner systems may employ different scanning principles ranging from focus scanning, confocal scanning, triangulation, or others.

The term 3D model may refer to a three-dimensional tooth model that includes topological surface information with or without information of sub-surface topology. The sub-surface information may be obtained using scanning techniques that utilize illumination light that is capable of penetrating patient's tooth surface and in response allows for acquisition of the sub-surface information.

In an embodiment, the wavelength of light used to illuminate the tooth surface for obtaining the color data and/or topological information used for generating the digital 3D model is different from the wavelength of light used for to illuminate the tooth surface for obtaining the fluorescence data. In another embodiment, the light used to illuminate the tooth surface for obtaining the color data and/or topological information used for generating the digital 3D model includes a plurality of wavelengths that include wavelength of light used to illuminate the tooth surface for obtaining the fluorescence data. In yet another embodiment, the light used to illuminate the tooth surface for obtaining the color data and/or topological information used for generating the digital 3D model includes a plurality of wavelengths but devoid of wavelength of light used for to illuminate the tooth surface for obtaining the fluorescence data.

In an embodiment, the first digital 3D model including the first texture data and second digital 3D model including the second texture data are placed in the common texture space. Placing the models in common texture space by uniformizing texture allows for an accurate visualization and comparison between the first texture data and second texture data in order to generate the digital 3D model representing development of the dental condition. This may include determining at least one texture modifying parameter, and applying the at least one of the at one texture modifying parameter to at least one of the first texture data or the second texture data.

There may be variations during recording of the texture data at different time points like during first time point and second time point, leading to the obtained texture data that are unsuitable for comparison. Such variations may include at least one of, but not limited to, ambient light in the room where the texture data is recorded or intraoral scanners that are used to record the texture data due to e.g. differences between scanners, between mirrors in different tip, between color calibrations. This would affect any detection and monitoring of patient's dental health because the actual clinically relevant differences may not be properly ascertained. Placing the first texture data and second texture data in the common texture space is particularly helpful because doing so, would at least substantially overcome the problems associated with the variations and allow for a more accurate and reliable visualization and comparison that is based on the first texture data and second texture data.

The phrase "texture space" may refer to specific organization of texture, such as a color space. Placing the first texture data and second texture data in the common texture space is achieved by uniformizing texture, which may refer to minimizing variations between the first texture data and second texture data. Uniformizing the texture may generally be understood as texture calibration, and may include transformation that includes minimizing the difference between texture component values of comparable regions of the first texture data and second texture data.

In one embodiment, the texture calibration includes minimizing the difference between the texture component values of comparable regions of the first texture data and second texture data, wherein the texture component values relate to texture data in texture space in which texture data is obtained or present in the digital 3D model such as in the RGB color space. This allows for finding at least one transformation operator to calibrate the texture data, which may include one of the first texture data or second texture data. The calibration results in a calibrated texture data and thus in uniformization of texture. The calibrated texture data may then be associated with the digital 3D model whose texture data is calibrated.

In another embodiment, the texture calibration includes i) converting, for comparable regions, the first texture data and second texture data to a uniform texture space or other texture space, and ii) minimizing the difference between the converted first texture data and converted second texture data. This allows for finding at least one transformation operator to calibrate the texture data, which may include one of the first texture data or second texture data. The calibration results in a calibrated texture data and thus in uniformization of texture. The calibrated texture data is converted into a target texture space, i.e. the texture space in which the texture data is to be visualized and/or compared with other texture data. Such conversion may be part of the calibration as well. The calibrated texture data, after this conversion, may then be associated with the digital 3D model whose texture data is calibrated. The uniform texture space may include perceptually uniform texture space, with respect to human texture (e.g. color) vision such as LAB color space. The other texture space refers to texture space other than the one in which texture data is obtained or present in the digital 3D model prior to conversion. For example, if the first and second texture data is initially represented in RGB color space, then these texture data may be converted into LAB color space. The values of texture components of the converted first and second texture data in LAB color space is minimized and then at least one transformation operator to calibrate the texture data (e.g. first texture data) to a calibrated texture data is identified. The calibrated (e.g. first) texture data is then converted into an RGB color space in which the second texture data is already present.

In an embodiment, placing the first digital 3D model including the first texture data and second digital 3D model including the second texture data with the texture data in the common texture space includes determining at least one texture modifying parameter, and applying the at least one of the at one texture modifying parameter to at least one of the first texture data or second texture data.

The at least one texture modifying parameter comprises at least one transformation operator that is configured to minimize variations between texture values of comparable regions of the first digital 3D model and second digital 3D model. The at least one transformation operator may allow for one of i) converting the first and second texture data from one texture space to the uniform or other texture space and minimizing the difference between the transformed first and second texture data, iii) minimizing the difference between the transformed first and second texture data after the first and second texture data are converted into uniform or other texture space, or ii) minimizing the difference between the first texture data and second texture data, first texture data and second texture data being in the texture space in which the first and second texture data is obtained or present in the first and second digital 3D model.

The texture calibration may be achieved by local adjustment or global adjustment of values, by way of applying the at least one texture modifying parameter, associated with one or more components of texture in at least one of the first digital 3d model or second digital 3d model. The local adjustment relates to texture calibration that is applied to a selected region of a tooth for which caries are to identified. The global adjustment relates to texture calibration that is applied to the whole tooth for which caries are to identified. In an embodiment, a plurality of teeth may undergo the local adjustment or global adjustment.

According to an embodiment, a method for placing digital 3D models in common texture space is disclosed. The method includes selecting one of the first digital 3D model or second digital 3D model;

selecting at least one region from the selected digital 3D model, the selected region being used for texture calibration;

identifying comparable region on another model comprising one of the non-selected first digital 3D model or second digital 3D model;

generating at least one texture modifying parameter comprising transformation operator(s) based on texture data of the selected region of the selected model and texture data of comparable region of the non-selected another model; and applying the at least one generated texture modifying parameter on the texture data of the comparable region of the non-selected another model.

The above method may further include displaying, on a display unit, the non-selected another model having the at least one generated texture modifying parameter applied on the texture data of the comparable region.

In the embodiment of the preceding paragraph, application of the at least one generated texture modifying parameter produces texture calibration such as color calibration, which results in minimizing variations between the texture such as colors between the selected region and comparable region, the selected region and the comparable region together constitute the comparable regions.

In one embodiment, the at least one texture modifying parameter is based on the first texture data and second texture data. Applying the at least one texture modifying parameter comprising transformation operator(s) on the second texture data calibrates the second texture data and brings the calibrated second texture data to the common texture space, which is defined by the first texture data. In another embodiment, the at least one texture modifying parameter is based on the first texture data and second texture data. Applying the at least one texture modifying parameter comprising transformation operator(s) on the first texture data calibrates the first texture data and brings the calibrated first texture data to the common texture space, which is defined by the second texture data. In yet another embodiment, the at least one texture modifying parameter is based on a standard texture data of a standard digital 3D model. The at least one texture modifying parameter comprises a first transformation operator(s) based on the first texture data and the standard texture data and a second transformation operator(s) based on the second texture data and the standard texture data. Applying the first transformation operator(s) on the first texture data and applying the second transformation operator(s) on the second texture data brings both the first texture data and the second texture data to the common texture space, which is defined by the standard texture data. In yet another embodiment, the at least one texture modifying parameter is based on predefined texture data. The at least one texture modifying parameter comprises a first transformation operator(s) based on the first texture data and predefined texture data and a second transformation operator(s) based on the second texture data and the predefined texture data. Applying the first transformation operator(s) on the first texture data and applying the second transformation operator(s) on the second texture data brings both the first texture data and the second texture data to the common texture space, which is defined by the predefined texture data.

In order to place the first digital 3D model and the second digital 3D model in the common texture space, a target texture data that defines the target texture space is selected/defined. Such selection/definition may be based on at least one of the first digital 3D model, the second digital 3D model, a standard digital 3D model, or a predefined texture space. Thus, determining the at least one texture modifying parameter is based on a reference selected from one of the first digital 3D model, the second digital 3D model, a standard digital 3D model, a predefined texture space, or a combination thereof. The at least one texture modifying parameter may be determined based on the target texture space and the texture space of one or more of the digital 3D models that need to at least substantially match, by uniformization of texture, with the target texture space.

In an embodiment, generating the at least one texture modifying parameter includes first identifying value(s) of texture components from the comparable regions. Such values for defining color may include 3 dimensional vectors and may be represented in different color spaces like RGB, LAB, HSV, etc. RGB is generally the most common color space but preferably, may be represented in the LAB color space through conversion of texture component from one color space to another color space. The identified values may be utilized to determine a difference in values. The method below is disclosed in relation to the RGB color space but may work using other color spaces like LAB color space. A reference table is generated, the reference table includes region specific relationship between values of RGB components in a reference and the model undergoing calibration. An illustrative table is included below.

TABLE 1

| Comparable Regions No. | Reference | Model undergoing calibration | Model undergoing calibration' | ... |
|---|---|---|---|---|
| 1 | C_R1 = (R_R1, G_R1, B_R1) | C_$C_R$1 = (R_$C_R$1, G_$C_R$1, B_$C_R$1) | ... | ... |
| 2 | C_R2 = (R_R2, G_R2, B_R2) | C_$C_R$1 = (R_$C_R$1, G_$C_R$1, B_$C_R$1) | ... | ... |
| 3 | ... | ... | ... | ... | where, C_R1 refers to Color at Region 1 in the reference with R_R1, G_R1, B_R1 representing RGB values for Region 1 in the reference, and C_$C_R$1 refers to Color at Region 1 in the model undergoing calibration with R_$C_R$1, G_$C_R$1, B_$C_R$1 representing RGB values for Region 1 in the model undergoing calibration. It is understandable that such table may include values for other regions such as Region 2 and for other models such as other Model undergoing calibration'.

In different embodiments, the reference is selected from one of the first digital 3D model, the second digital 3D model, a standard digital 3D model, a predefined texture space, or a combination thereof. It is understandable that when a standard digital 3D model, or a predefined texture space is used as reference, then uniformizing texture between first texture data and second texture data will require each of the first texture data and second texture data undergoing calibration, such that the difference in texture values between the first texture data and second texture data is reduced.

Generating the at least one texture modifying parameter may further include determining a difference between the values identified for the comparable regions.

The difference may typically be calculated as (as an illustration, the difference is shown for region 1)

$$D(C\_R1, C\_C_R1) = \text{Sqrt}((R\_R1 - R\_C_R1)^2 + (G\_R1 - G\_C_R1)^2 + (B\_R1 - B\_C_R1)^2)$$

where $D(C\_R1, C\_C_R1)$ represents the difference.

Generating the at least one texture modifying parameter may further include determining transformation operator(s) of texture such as colors to modify texture (e.g. colors) of the model undergoing calibration based on the calculated difference. Such transformation operator(s) may result in minimizing the difference, such as the least average difference, between the texture (e.g. colors) of comparable regions. As an example, the transformation operator(s) may include a 3×3 matrix M applied as $$C\_C_R1\_\text{calibrated} = M * C\_C_R1$$

where C_$C_R$1_calibrated texture (e.g. color) after applying the transformation operator(s) M to the pre-calibrated texture of Region 1 in the model undergoing calibration. The transformation operator(s) may also be a 3×3 Matrix combined with an offset, or only an offset or a higher order transformation.

The same principle may be applied to other regions such that local or global adjustment may be achieved.

Other conventionally known techniques for uniformizing texture may be applied. These may include techniques for converting texture from one texture space to another texture space, such as from RGB color space to uniform texture space and/or techniques for minimizing the difference such as a linear least square algorithm or a linear least square algorithm with constraints.

According to an embodiment, determining the at least one texture modifying parameter is based on a region of the reference comprising one of the first digital 3d model, the second digital 3d model, a standard digital 3d model. The method may be configured to automatically select the region. Additionally or alternatively, the portion of the reference may be user selected. For example, the user interface may include an eyedropper tool that allows the user to select a region of the model, such as by using a mouse, based on which at least one texture modifying parameter is determined. In particular, the eyedropper tool allows the user to select texture such as color by moving the eyedropper over different regions having individual color and then sampling the color (e.g., by performing a cursor operation such as click-and-drag operation or performing a touch-and-drag operation on a touchscreen). The sampled color may be used to determine determining the transformation operator(s), as described earlier.

In different embodiments, prior to calculating the difference, the values of texture components (such as RGB components for color) for different regions may be weighted in different ways. For example, a number that determines the blue overlay may be used; a number that indicates number of colors that have been averaged, a number containing quality of the data based on viewing angle and checker board pattern amplitude may also be used.

In any of the embodiments where a difference is determined between the texture data for determining the at least one texture modifying parameters, the method may include identifying the calculated difference (for example, $D(C\_R1, C\_C_R1)$) as outliers if the calculated difference is higher than a certain threshold. Regions that result in difference that is higher than the certain threshold may be prevented from being used for determining at least one texture modifying parameter because these differences may represent actual changes between the texture data of the first digital 3D model and that of second digital 3D model. Thus, such regions may not be utilized for generating the transformation operator(s) for placing the models in the common texture space.

In different embodiments, the texture (such as color), based on the at least one texture modifying parameter, for modification may be identified based on at least one of by distributing the modified colors equally on the model to be modified, by choosing regions with the highest blue overlay number, by choosing color on the teeth only, by choosing colors on the gingiva only, by user selected region having color, by user selected regions that are indicated to be unchanged, by choosing a specific ratio between number of colors on the gingiva and on the teeth, by choosing regions on the teeth that are typically unchanged like smooth surfaces on the incisors, or by choosing regions that have small geometry differences, and by excluding regions with large geometry changes.

In an embodiment, a scoring function on at least a part of the first texture data is applied to generate a first set of classification score corresponding to different regions of the first digital 3D model; and/or the scoring function is applied on at least a part of the second texture data to generate a second set of classification score corresponding to different regions of the second digital 3D model. The set of classification score represents a collection of scores individually associated with different regions of the model. Typically, the scoring function is applied on texture data relating to tooth of the patient, but scoring function may be applied to other parts of oral situation to identify other dental conditions such gingiva to identify gingivitis.

Processing the texture data by applying the scoring function comprises detecting one or more caries sites present on patient's teeth, as will be visualized in the digital 3D model (described later).

In different embodiments, the scoring function comprises a mathematical relationship comprising one of i) different texture components of a region from a texture data, ii) a single texture component of a region from a texture data, iii) same or different texture component(s) of different regions from a texture data, or iv) a single texture component of a region from a first texture data and different texture components of a region from second texture data. Furthermore, the method includes applying the scoring function on at least a part of the first texture data comprises using, in the scoring function, texture component value(s) from the first texture data, and applying the scoring function on at least a part of the second texture data comprises using, in the scoring function, texture component value(s) from the second texture data.

In an embodiment, the scoring function may include a mathematical relationship comprising different texture (e.g. color) components from a region, typically resulting in numerical value i.e. classification score. The classification score may indicate a contrast or a contrast version between at least two texture components such as between Red component and Green component of a region or indicate a loss of representation of a component (e.g. green color component) from a region. For example, the mathematical relationship is based on Red color component and Green color component. The method further includes applying the scoring function on at least a part of the first texture data and on at least a part of the second texture data. Such application includes using, in the scoring function, texture component values, e.g. Red color component value and Green color component value of a region, from the first texture data to generate the first set of classification score. Further, the application includes using, in the scoring function, texture component values, e.g. Red color component value and Green color component value of a region, from the second texture data to generate the second set of classification score.

In one embodiment, the scoring function is defined by Scoring Function 1

$$f(R,G)=(R-G)/(R+G)$$

where R represents value of Red channel and G represents value of the Green channel for a region, obtained from texture data such as fluorescent data, of a digital 3D model. The illustrated scoring function represents a contrast where higher the value of f(R,G), higher the contrast and higher the severity of caries.

In another embodiment, the scoring function is defined by Scoring Function 2

$$f(R,G)=(n_1*(n_2R+n_3)/((n_4G+n_7)+n_8)-n_9)/n_{10}$$

where R represents value of Red channel, G represents value of the Green channel for a region, obtained from texture data such as fluorescent data, of a digital 3D model and $n_1$ through $n_{10}$ represents a number. The illustrated scoring function represents a contrast version where higher the value of f(R,G), higher the severity of caries.

As an example, the equation of the above embodiment may be written as $$f(R,G)=(300*r/(g+0.0000001)-150)/255$$

where
r=((90/255)*R)+(60/255),
g=((185/255))*G+(70/255)

In another embodiment, the scoring function comprises a mathematical relationship comprising a single texture component for a region. One such scoring function includes $$f(G)=(1-G) \quad \text{Scoring Function 3:}$$

where G represents value of the Green channel for a region, obtained from texture data such as fluorescent data, of a digital 3D model. The illustrated scoring function represents a loss of representation of Green component where lower the value of f(G), higher the severity of caries. Applying the scoring function include using, in the scoring function, Green component value of a region from the texture data. Typically use of texture component values is region specific.

In another embodiment, the classification score is based on healthy regions. This includes a mathematical relationship between one of i) same texture (e.g. color) component from different regions such as healthy regions and region comprising lesion, or ii) different texture (e.g. color) components from different regions such as healthy regions and region comprising lesion. The method further includes applying the scoring function on at least a part of the first texture data and on at least a part of the second texture data. Such application includes using, in the scoring function, texture component values, e.g. color component values of same or different texture components different regions, from the first texture data to generate the first set of classification score. Further, the application includes using, in the scoring function, texture component values, e.g. color component values of same or different texture components from different regions, from the second texture data to generate the second set of classification score.

In different embodiments, the scoring function may be defined by one of the following mathematical relationships $$f=(G_{HA}-G_L))/G_{HA} \quad \text{Scoring Function 4:}$$

$$f=(R_{HA}-R_L))/R_{HA} \quad \text{Scoring Function 5:}$$

$$f=((G_{HA}-G_L))/G_{HA})+((R_{HA}-R_L))/R_{HA}) \quad \text{Scoring Function 6:}$$

$$f=(G_L+R_L)/(G_{HA}+R_{HA}) \quad \text{Scoring Function 7:}$$

$$f=1-((G_L+R_L)/(G_{HA}+R_{HA})) \quad \text{Scoring Function 8:}$$

where, $G_{HA}$ and $R_{HA}$ are average values of Green and Red components from healthy regions, and are $G_L$ and $R_L$ values of Green and Red components from region comprising lesion. $G_{HA}$ and $R_{HA}$ may represent values that are obtained from the 3D model comprising the tooth for which classification score is calculated, or such average values may represent average values that are obtained from healthy regions of different 3D models of the same patient, for example from 3D models generated based on prior scans. Thus, scoring functions 4 and 5 represent mathematical relationship between same texture (e.g. color) component from different regions such as healthy regions and region comprising lesion, and scoring functions 6 through 8 represent mathematical relationship between different texture (e.g. color) components from different regions such as healthy regions and region comprising lesion.

In the texture data represented by the fluorescence data, presence of less green light in a region may generally indicate loss of healthy tooth material, which may suggest dental condition. Similarly, presence of more red light in the region indicates a cariogenic region. Thus, the scoring function may be designed to output a numerical value that captures this principle of designating dental condition in the digital 3D model.

In yet another embodiment, the scoring function may include mathematical relationship comprising a single texture component of a region from a first texture data and different texture components of a region from second texture data. One such scoring function include $$f=(1-G_f)+(1-R_c)+(1-G_c+(1-B_c)) \quad \text{Scoring function 9:}$$

where, $G_f$ may represent value of Green component of a region from fluorescent data, $R_c$, $G_c$, $B_c$ may represent values of RGB components of the region from color data. Applying the scoring function on at least a part of the first texture data and on at least a part of the second texture data includes using, in the scoring function Green color value from fluorescent data and RGB color values from color data. Typically use of texture component values is region specific.

In embodiments where the classification score is based on healthy region, the method includes estimating weighted average/average value for at least one texture component such as Green color component from healthy regions of the at least one tooth. This may be achieved by, for example by sampling, at each vertex or facet in the mesh forming the 3d model for which classification is to be calculated, the value of the at least one component value from texture data and generating a histogram from the sampled texture values. Such histogram typically includes a distribution comprising distribution of texture values for gingiva, distribution of healthy tooth texture values, distribution of diseased tooth texture values, and noise. If the model is segmented, the histogram may be based on individual dental object or group of dental objects. The group of dental objects may include teeth with or without gingiva. Thus, for the texture value distribution, the digital 3D model as a whole may include group of dental objects including teeth with gingiva, but preferably without gingiva. The method further includes identifying regions representing the healthy regions and determining a weighted average/average value for the at least one texture component for the healthy region. Such weighted average/average may be based on mode, median or mean of the distribution.

The distributions for diseased tooth color values and the gingiva color values may likely overlap such as in fluorescent data, as they both dark and red, making it difficult to distinguish between the two. However, with segmentation of the 3D model in different dental objects like gingiva or tooth and tooth type, it is possible to identify which parts of a mesh belong to teeth and which to gingiva and to filter out the gingiva and sample only fluorescence color values from the teeth, thus overcoming the stated problem. The distribution for healthy tooth color values has higher color intensities, thus allowing identification of healthy regions and allowing to calculate the average. Finding the mode of the distribution of the color values belonging to healthy teeth may be possible from a multimodal distribution made up of the distribution of healthy tooth color values, and a multimodal noise distribution. Thus, it will be possible to identify the healthy tooth color distribution and calculate its average.

The disclosure for identifying healthy region may be described in relation to severity value but is equally applicable for all disclosed embodiments requiring the identification of healthy region or determination based on the healthy region. The healthy (dental) region may be understood as a region that may be used as a reference in several disclosed methods such as in identification function, severity function or scoring function when generating the virtual three-dimensional model representing a dental condition or development of dental condition. The healthy (dental) region may also include regions that may be classified as regions in good health conditions. Such regions are typically the regions that may be identified, with substantially high probability, as regions in good health condition.

In accordance to an embodiment, the identification of the region containing the dental condition and/or severity value may require identifying a healthy dental region. In one embodiment, the identification of the healthy region in the obtained first digital 3D model may be performed by a user. The user may perform a visual inspection of at least one of the texture data to manually identify the healthy region(s). For example, the user may visually inspect the texture (color) data on the first digital 3D model and selecting a region with a mouse, thus registering the selected region as the healthy region.

Additionally or alternatively, the healthy region in the obtained first digital 3D model may be identified, for example automatically, based on an evaluation of one or more texture components, as obtained from fluorescence data and/or color data. For example, the one or more texture components includes one or more of red channel, green channel, or a combination of red and green channels from the fluorescence data. In another example, the one or more texture components may include one or more of red channel, green channel, blue channel, or a combination two or more of the red, green, or blue channels. In yet another example, different channels from the color data and fluorescence data may also be utilized.

In one embodiment, for the at least one texture component of the one of the obtained texture data, the evaluation of one or more texture components may be performed by determining a reference value based on texture value distribution relating to the at least one texture component of the one of the texture data. Thereafter, regions having respective value of the texture component corresponding to the at least one texture component within a certain range of the determined reference value is identified as the healthy region. Alternatively, for the one of the obtained texture data, a reference value is determined based on texture value distribution relating to the one of the obtained texture data, and identifying regions having value of texture within a defined range of the determined reference value as the healthy region. In this embodiment, the determination and identification are based on the one of the texture data as a whole, i.e. contribution from all texture components of the one of the texture data is accounted for instead of a selection of one or more texture components from the one of the texture data.

In either of the preceding embodiments, the texture value may include intensity value of the at least one texture component/intensity value of the one of the texture data or any value derivable from the intensity value. The texture value distribution may be understood as frequency of value distribution across regions (e.g. different facets/vertices of the mesh) forming the obtained digital 3D model or a dental object. An example of such texture value distribution includes a histogram such as a color intensity histogram, which may be representative of frequency of intensity distribution across different regions (e.g. different facets/vertices of the mesh) forming the obtained digital 3D model or a dental object. Such color intensity histogram may be for the one of the texture data such as fluorescence data or a texture component (eg. red channel or green channel) of the one of the texture data. The determination of the reference value includes calculating a value based on the texture value distribution of the at least one texture component of the one of the obtained texture data or the one of the texture data. Such calculation may include calculating one of an average, weighted average, a median, a mode, or fitting the distribution to a data and selecting a mode of the fitted distribution. The texture value for a component or for the texture data as a whole for the purpose of identifying healthy regions or using in different disclosed functions may be determined by techniques conventionally known in the field of computer modeling and digital imaging.

As an example, the texture value distribution includes color histogram that are generated by extracting a specific color component (channel) from the digital 3D model or a specific dental object, and plotting counts (e.g. number of regions) vs color intensity. After a scanning session are completed, the texture data (fluorescence data and color data) obtained may be stored in the different vertices of the final 3D mech model by utilizing the concept of vertex colors. In this case each vertex may contain two color components, one for normal color texture represented in RGB space [R: 0-255; G: 0-255 B: 0-255] and one for fluorescence data also represented in RGB space [R: 0-255; G: 0-255; B: 0]. For fluorescence data no blue data component is available, as that color is filtered out during the scanning process or after wards. When extracting histograms of the different color components for the fluorescence texture data, the red (R) data component from each vertex is extracted and like-wise, the green (G) component may be extracted to generate a green color histogram for the fluorescence texture. This means that when displaying a fluorescence texture data histogram of green component, the low intensity green values originate from vertices containing mainly red component and vica versa, and therefore it may be useful to filter the low intensity green values when determining the reference value.

In one embodiment, the determination of the reference value may be performed for the first digital 3D model as a whole. In other words, the texture value distribution for the first digital 3D model as a whole represents texture value relating to the entire digital 3D model or model portion that is more than an individual dental object, i.e. collection of dental objects (e.g. teeth) but less than the entire digital 3D models. The model portion that is more than an individual dental object may include more than one tooth with gingiva, but preferably without gingiva. The selection of more than one dental object may be achieved either through selection of regions manually or automatically through selection of dental objects after segmentation of the digital 3D dental model. The user may have the possibility of updating the automatic selection. Thus, identification of the dental condition and determination of severity value may utilize a healthy region from any part of the dental model. Using the digital 3D model as a whole as disclosed in this embodiment may be useful in a situation where it is difficult to obtain a reliable reference value from the texture value or texture value distribution of the dental object that is inspected for the presence of the dental condition. The situation may arise when the dental object comprising the region being inspected for presence of the dental condition has severe dental condition like large caries lesion or tooth coverage, typically substantially, by non-tooth material like dental fillings. This approach may be computationally faster when determining severity values for different dental objects because the reference values are determined and healthy regions identified for the entire model as a whole rather than at individual tooth basis. Thus, wherever applicable, the texture value from the healthy region identified in accordance with this embodiment may be used.

In another embodiment, prior to the determining the reference value, the obtained first digital 3D model is segmented into individual dental objects, and evaluation at individual tooth basis is performed. The individual dental object may represent a plurality of individual tooth and gingiva and may also include non-tooth material like dental fillings and implants. This allows for utilizing texture value distribution specific to an individual dental object such as the tooth being inspected for presence of the dental condition, neighboring tooth, same tooth type. Therefore, the identification of the dental condition and determination of the severity value is based on healthy region from a specific dental object (e.g. tooth), i.e. at individual tooth basis. This may be particularly useful, for example molar and premolar teeth are generally darker and may have lower texture value than other teeth such as incisors. A locally calculated healthy region at individual tooth basis is likely to perform better than a global (i.e. using digital 3D model as a whole) when using healthy region for determining level of severity.

Because the dental objects are individually identifiable, the segmentation also offers the possibility of identifying the dental condition and/or determination of the severity value utilizing texture value or healthy region from an individual dental object such as from the tooth that is inspected for presence of the dental condition, neighboring tooth, same tooth type. In one embodiment, the identification at individual tooth basis comprises identifying the healthy region of the tooth that comprises a region that is inspected for presence of the dental condition and the texture value distribution relating to the at least one texture component or the one of the obtained texture data that is derived from the tooth that is inspected for the presence of the dental condition. As the healthy region is localized to the tooth being evaluated for the dental condition, this approach may present the most reliable results when determining presence of the dental condition and severity values. In another embodiment, the identification at individual tooth basis includes identifying the healthy region of a tooth neighboring to the tooth inspected for the presence of the dental condition and the texture value distribution relating to the at least one texture component or the one of the obtained texture data is derived from the neighboring tooth. In yet another embodiment, the identification at individual tooth basis includes identifying the healthy region of a tooth, in the first digital 3D model, that is same tooth type as the tooth that comprises a region that is inspected for presence of the dental condition and the texture value distribution relating to the at least one texture component or the one of the obtained texture data is derived from the tooth that is same tooth type as the tooth that is inspected for the presence of the dental condition. Same tooth type may refer to types of teeth in an oral cavity such as incisors, canines, premolars, or molars. The same tooth type may be identified by applying feature detection techniques that allow for detecting features of the dental objects in segmented obtained first digital 3D model, thereby allowing to identify same dental object types based on at least substantially same feature set such as landmarks. The embodiments utilizing neighboring tooth or same tooth type may be useful in a situation where it is difficult to obtain a reliable reference value from the texture value or texture value distribution of the dental object that is inspected for presence of the dental condition. The situation may arise when the dental object comprising the region being inspected for presence of the dental condition has severe dental condition like large caries lesion or tooth coverage, typically substantially, by non-tooth material like dental fillings. Thus, wherever applicable, the texture value from the healthy region identified in accordance with these embodiments may be used, i.e. from the healthy region of the tooth being inspected for presence of the dental condition, from neighboring tooth of the tooth being inspected for presence of the dental condition or same tooth type as the tooth being inspected for presence of the dental condition.

The texture value distribution, either from the digital 3D model as a whole or from a dental object, may include texture value distribution from different regions that include the healthy regions, regions potentially having dental conditions and likely noise signal. Thus, a filtering may be applied to obtain filtered texture value that may correspond to potentially healthy regions. In an embodiment, prior to the determining the reference value, the texture value is filtered, and a filtered texture value distribution is obtained. This is achieved by filtering out texture components or texture data having respective texture value outside a defined texture value range, and the reference value is determined based on the texture value distribution falling within the defined texture value range. The healthy regions typically have texture values higher than the dental condition regions, which usually have texture values that represent a concentration of low texture values. The filtering may be employed by defining at least one of at least minimum value threshold, i.e. lower threshold. For example, texture values (intensities) below a certain value such as 15 may be filtered out for the darker face colour histograms. A maximum value threshold, i.e. upper threshold, may also be employed to filter out regions that may represent high texture values, for example texture value representing oversaturated situations like highlights. The filtering, especially the minimum value threshold, allows for removing the outliers (e.g. potentially diseased regions) that may negatively influence determining the reference value, and thus affect identification of the healthy region. Therefore, the disclosed filtering improves reliability in determining the reference value and identification of the healthy regions. The skilled person would appreciate that the filtering may be applied either on the texture value distribution or while selecting the texture values falling within the range prior to defining the texture value distribution.

In any of the preceding embodiments, the filtering may be performed either automatically or with user intervention. For example, the user may define the threshold value(s) to define the defined texture value range. Likewise, an automatically defined texture value range may be updated through user intervention. In another embodiment, filtering of the texture value distribution for identifying healthy region is performed on morphological entity data represented in the first digital 3D model. This is implemented by segmenting the first digital 3D model into dental objects, identifying additional sub-tooth information such as, fissures, cusps, facial and buccal surfaces etc. The filtering may be configured to filter out texture value data corresponding to one or more of the sub-tooth information.

In several embodiments, the healthy region is identified based on one of i) at least one of the texture data as a whole, or ii) one of one texture component only, individually for each texture component, a combination of two or more texture components. That is, the texture value distribution based on which the reference value is determined and healthy region is identified is based on one of the above-mentioned texture data. In one embodiment, the healthy region is identified utilizing texture value distribution of only one texture component from one of the texture data. The choice of the one texture component is based on texture value distribution satisfying a defined criterion. Thus, texture component values from the identified healthy region are used in the identification function and severity function. As the healthy region is identified using only one texture component, the computation may be made faster. Furthermore, choice of the texture component satisfying the defined criterion may also improve the accuracy of the identification of the healthy region. In another embodiment, the healthy region is identified individually for each texture component of one of the texture data. If a texture component is not available in the one of the texture data (e.g. fluorescence data), then the missing texture component may be used from the other texture data (e.g. color data). That is, for each texture component, texture value distribution is defined and healthy region specific to each texture component is identified. The texture component value from the identified healthy region, specific to a texture component, is used for the specific texture component in the identification function and severity function. For example, a healthy region identified based on color intensity distribution of green channel is used to provide green channel intensity value for healthy region in the identification function and severity function. Similarly, a healthy region identified based on color intensity distribution of red channel is used to provide red channel intensity value for healthy region in the identification function and severity function. This may allow for using healthy region identified specifically using a texture component when the texture value of the texture component is used in the identification function or severity function. In another embodiment, the healthy region is identified based on combination of two or more texture components. This may be employed, for example, by utilizing a texture value distribution of a first texture component (e.g. red channel) to identify a first healthy region and utilizing a texture value distribution of a second texture component (e.g. green channel) to identify a second healthy region. An overlap of the first healthy region and the second healthy region may define the healthy region from which texture component values are chosen to be used in the identification function and severity function. Using an overlapping healthy region as the healthy region may improve the reliability of the identification of the healthy region. In yet another embodiment, the healthy region is identified utilizing texture value distribution of at least one of the texture data as a whole, i.e. without using individual texture value distribution of different texture components, instead using the texture value distribution of the one of the texture data comprising combined effect of different texture components. Thus, texture component values from the identified healthy region are used in the identification function and severity function. As the healthy region is identified using one of the texture data as a whole, this approach may be computationally faster.

In view of above embodiments, it would be apparent to the skilled person that the determination of the reference value and identification of the healthy region may be based on a combination of a morphological entity and texture value obtainable from the morphological entity. The morphological entity may include one of the first digital 3D model as a whole, dental object being inspected for presence of the dental condition, neighboring tooth or tooth of same tooth type as the tooth being inspected for presence of the dental condition. Similarly, the texture value may include at least one of the texture data or at least one of the texture components from at least one of the texture data. The disclosure, as indicated earlier, generally provides a guidance of situations where a particular morphological entity and texture value may be preferred over another.

In view of above embodiments, it would be apparent to the skilled person that other scoring functions may also be utilized to generate a set of classification score for different regions of the digital 3D model. Such scoring functions may also include dental condition specific scoring functions. It is apparent that choice of which scoring function to use may be determined by specificity and sensitivity of the score generated by different scoring functions, where specificity relates to percentage of healthy regions that are correctly identified as not having the dental condition, and sensitivity relates to percentage of diseased regions that are correctly identified as having the dental condition. For example, the choice may be based on specificity and sensitivity individually satisfying respective threshold and a sum of specificity and sensitivity also meeting a minimum threshold. Similarly, choice of identification function and severity function may be based on the specificity and sensitivity meeting a minimum threshold criterion.

In an embodiment, the method includes mapping the generated first set of classification score onto the at least the part of the first digital 3D model or a copy of the first digital 3D model. The first digital 3D model or a copy thereof includes the first texture data or is devoid of the first texture data. Additionally or alternatively, the method includes mapping the generated second set of classification score mapped onto the at least a part of the second digital 3D model or a copy of the second digital 3D model. The second digital 3D model or a copy thereof comprising the mapped second set of classification score includes the second texture data or is devoid of the second texture data.

In an embodiment, the first digital 3D model, a copy of the first digital 3D model, second digital 3D model, and a copy of the second digital 3D model that are devoid of the texture data may be obtained either by scanning a gypsum model of patient's teeth or by removing color data from the digital 3D model comprising the color data and obtained by scanning of the patient's teeth using the intraoral scanner. In an embodiment where the first digital 3D model, a copy of the first digital 3D model, second digital 3D model, and a copy of the second digital 3D model include the texture data, such texture data may include color data and/or fluorescence data.

In different embodiments, the visual indicator may include a pointer, heat map, or any other graphical representation typically overlaid on patient's dental 3D model indicating the region-specific severity value or level of severity or other properties like scoring value, rate, or development of the dental condition. The visual indicator may be presented with different properties to indicate different ranges of severity values or different levels of severity. In case of the heat map, different properties may include different colors. For example, the moderate level of severity may be represented in orange color and high level of severity may be represented in Red color.

Mapping the first set of classification score usually includes representing classification scores, comprised within first set of classification score, on the first digital 3D model or a copy thereof. Additionally or alternatively, mapping the second set of classification score comprises representing classification scores, comprised within second set of classification score, on the second digital 3D model or a copy thereof. Because the classification score is determined for a specific region from the digital 3D model, mapping the classification score includes overlaying or superimposing the classification score over the specific region. Such overlaying or superimposing allows for representing the classification score on the digital 3D model by way of a visual indications such as colors or markings.

Typically, the mapping the first set of classification score usually includes representing classification scores, comprised within first set of classification score, falling within predefined different score ranges with different visual indications (e.g. colors or marking) on the first digital 3D model or a copy thereof. Additionally or alternatively, mapping the second set of classification score comprises representing classification scores, comprised within second set of classification score, falling within the predefined different score ranges with different visual indications on the second digital 3D model or a copy thereof. As disclosed earlier, the classification score may represent not only presence of caries but also severity of caries. The method includes defining different score ranges that relate to severity of the caries, and each score range may be associated with a specific color or marking. Therefore, more than one classification score comprised in the set of classification score are categorized in one of the defined score ranges and accordingly mapped onto the digital 3D model with the color or marking that is associated with the score range in which the classification score is categorized. An illustrative categorization of classification score in relation to severity and associated color is shown below.

TABLE 2

| Category | Classification Score (CS) Range | Associated color |
| --- | --- | --- |
| Sound | CS < S1 | Green |
| Initial Caries, such as Initial Lesion in Enamel | S1 ≤ CS < S2 | Yellow |
| Moderate, such as Initial Lesion in 1/3 of dentin | S2 ≤ CS < S3 | Orange |
| Extensive, such as Extensive Lesion (2/3-3/3 of dentin) | S3 ≤ CS | Red | where, CS is the classification score for a region of the digital 3D model and S1 through S3 are classification scores defining the ranges It is apparent that the skilled person may vary at least one of granularity of categories by increasing or decreasing number of categories, vary the score range and change associated colors. Such variations are within the scope of the disclosure.

In an embodiment, the method includes comparing the first texture data and the second texture data comprises determining, for more than one corresponding regions, difference scores between the first set of classification score and second set of classification score. The difference score is calculated for corresponding regions from the first digital 3D model and second digital 3D model, i.e. a region from the first digital 3D model that corresponds to the region from the second digital 3D model. The difference between the classification score is useful in presenting region specific development of caries between the first time point and the second time point.

In another embodiment, the method includes comparing the first texture data and the second texture data. Such comparison includes determining texture difference values, for more than one corresponding regions, between texture values comprised in the first texture data and texture values comprised in the second texture data. Thus, in this embodiment, instead of calculating a difference between the classification score, identification of the caries development may be determined based on the difference in the texture data. Such difference is region specific, i.e. the texture data for a region from the first digital 3D model is compared with the texture data from corresponding region of the second digital 3D model.

In an embodiment, generating the digital three-dimensional model representing development in dental caries includes mapping the difference scores and/or texture difference values onto a digital 3D model. The digital 3D model includes one of the at least one of the first digital 3D model, the second digital 3D model, a copy of the first digital 3D model, or a copy of second digital 3D model. The first digital 3D model or the copy of the first digital 3D model includes the first texture data or is devoid of the first texture data. Additionally or alternatively, the second digital 3D model or the copy of the second digital 3D model includes the second texture data or is devoid of the second texture data.

Because the difference score or texture difference values is determined for corresponding regions of the digital 3D models, mapping the difference score or texture difference value includes overlaying or superimposing the difference score or texture difference value over the region for which the difference score or texture difference value is calculated. For the digital 3d model including one of the first digital 3D model or the second digital 3D models, such overlay or superimposing is made on respective region that are considered corresponding region. The copy of the first digital 3D model or copy of second digital 3D model, when used as the digital 3D model representing development of caries, may utilize a region (for overlaying or superimposing) that reflect corresponding regions of the first digital 3D model or of the second digital 3D model respectively. Such overlaying or superimposing allows for representing the difference score or texture difference value on the digital 3D model by way of a visual indications such as colors, or marking.

In an embodiment, the mapping the difference scores or texture difference values including representing the difference scores and/or texture difference values falling within predefined different difference ranges with different visual indications such as colors or markings.

The difference scores and texture difference values may represent severity of development of caries between the first time period and second time period. The method includes defining different defined difference ranges (different for difference scores and for texture difference values) that relate to severity of development of caries, and each difference score and/or texture difference value may be associated with a specific color or marking. Therefore, more than one difference score or texture difference value are categorized in one of the defined difference ranges and accordingly mapped onto the digital 3D model with the color or marking that is associated with the difference range in which the difference score or texture difference value is categorized.

An illustrative categorization based on the difference score or texture difference value in relation to development of caries and associated color is shown below. For simplicity reasons, both embodiments covering difference score and texture difference value are represented in the same table.

TABLE 3

| Category | Predefined difference range | Associated color |
| --- | --- | --- |
| Small change | DS < DS1 and/or TDV < TDV1 | Green |
| Mild Change | DS1 ≤ DS < DS2 and/or TDV1 ≤ TDV < TDV2 | Yellow |
| Moderate Change | DS2 ≤ DS < DS3 and/or TDV2 ≤ TDV < TDV3 | Orange |
| Major Change | DS3 ≤ DS and/or TDV3 ≤ TDV | Red | where, DS is the difference score for corresponding regions and DS1 through DS3 are difference scores defining the ranges, TDV is the texture difference score for corresponding regions and TDV1 through TDV3 are texture difference values defining the ranges In accordance with the above table, the skilled person would appreciate that the development of caries is based on either the difference score or the texture difference value or a combination of the difference score and the texture difference value. In case of the combination, according to an embodiment, a priority rule may resolve the conflict if only one of the two conditions are met. For example, if DS3≤DS but the condition of TDV3≤TDV is not satisfied, the method may include applying the priority rule to categorize development of caries and accordingly presenting caries with an associated color on the digital 3D model. One such rule may include, prioritizing difference score for moderate and major change and prioritizing texture difference value for small or mild change, i.e. for the given example DS3≤DS is satisfied but TDV3≤TDV is not satisfied, then associated color is Red. According to the illustrated rule, if DS<DS1 is not satisfied but TDV<TDV1 is satisfied, then the associated color is Green. Other priority rules may also be employed and are within the scope of this disclosure. In case of the combination, according to another embodiment, the determination of region affected by the dental condition may be based on a sum or weighted sum of the difference score and texture difference value. The sum or weighted sum results in a summed score that may be linked to different ranges and visual indications that reflect severity of development of the dental condition.

It is apparent that the skilled person may vary at least one of granularity of categories by increasing or decreasing number of categories, vary the predefined difference range, change associated colors, and priority rules. Such variations are within the scope of the disclosure.

In an embodiment, the comparison of the first texture data and the second texture data comprises determining, for more than one corresponding regions, rates of development of dental caries based on i) the difference scores and time span between the second time point and first time point, or ii) the texture difference values and time span between the second time point and first time point.

In an embodiment, generating the digital three-dimensional model representing development in dental caries comprises mapping the rates of development of dental caries onto at least one of the first digital 3D model, the second digital 3D model, a copy of the first digital 3D model, or a copy of second digital 3D model. The first digital 3D model or the copy of the first digital 3D model includes the first texture data or is devoid of the first texture data. Additionally or alternatively, the second digital 3D model or the copy of the second digital 3D model includes the second texture data or is devoid of the second texture data.

Mapping rates of change based on the difference score or texture difference value includes overlaying or superimposing the rates of change over the region for which the difference score or texture difference value is calculated. As disclosed earlier; because the difference score or texture difference values is determined for corresponding regions of the first and second digital 3D models, such overlay or superimposing is made on a region that are reflect corresponding regions in the digital 3D model. Such overlaying or superimposing allows for representing the rates of change on the digital 3D model by way of a visual indications such as colors, or marking taking into account the time span in between the at least two acquired models.

In an embodiment, mapping the rates of development of dental caries includes representing the rates of change, preferably region specific, falling within predefined different rate ranges with different visual indications such as colors or markings.

The rate of change may represent severity of development of caries between the first time period and second time period. The method includes predefining different rates of change that relate to severity of development of caries, and each rate of change may be associated with a specific color or marking. Therefore, more than one rates of change are categorized in one of the defined rate of change and accordingly mapped onto the digital 3D model with the color or marking that is associated with the rates of change in which the rate of change is categorized.

An illustrative categorization based on the rate of change in relation to development of caries and associated color is shown below.

TABLE 4

| Category | Predefined rate range | Associated color |
| --- | --- | --- |
| Small rate | RoC < RoC1 | Green |
| Mild rate | RoC1 ≤ RoC < RoC2 | Yellow |
| Moderate rate | RoC2 ≤ RoC < RoC3 | Orange |
| Major rate | RoC2 ≤ RoC | Red | where, RoC is the Rate of Change for corresponding regions and RoC1 through RoC3 are rate of change defining the ranges In one embodiment, the categorization of rates of change may be based on the rates of change that is calculated in accordance with the different score or texture difference value. In another embodiment, the categorization may be based on a combined rates of change that is calculated in accordance with the different score and texture difference value.

It is apparent that the skilled person may vary at least one of granularity of categories by increasing or decreasing number of categories, vary the rate of change range, change associated colors. Such variations are within the scope of the disclosure.

The mapped representation of caries or development of caries by way of one of the difference scores, texture difference values or rates of change on the digital 3D model may provide an improved visibility in relation to the tooth surface compared to how to visible the identified cariogenic regions are on the physical tooth.

In an embodiment, a method for generating a representative digital 3D model is disclosed. The method includes
processing the first texture data and second texture data to determine a velocity function based on change in the texture data over the first time point and second time point;
determining future texture data at a future time point based on the velocity function, wherein the future texture data is determined prior to the patient's set of teeth reaching the future texture data; and
generating a representative digital 3D model of patient's teeth, wherein
i) the future the future texture data is mapped onto the representative digital 3D model; and/or
ii) development of dental caries is mapped onto the representative digital 3D model based on comparison of the future texture data and last acquired texture data for the patient.

In an embodiment of the preceding method, prior to processing the first texture data and second texture data, the first texture data and second texture data are placed in the common texture space by uniformizing texture.

According to an embodiment, a velocity function based on change in one or more component of the texture data or severity value between the time span between the obtaining of the texture data corresponding to the first digital 3D model and texture data corresponding to the second digital 3D model is determined. Furthermore, future texture data or severity value at a future time point based on the velocity function, wherein the future texture data is determined prior to the patient's set of teeth reaching the future texture data is determined. A representative digital 3D model of patient's teeth is generated. The representative digital 3D model includes the future texture data is mapped onto the representative digital 3D model. Additionally or alternatively, the representative digital 3D model of patient's teeth comprises future dental condition, determined based on calculating the severity values using the determined future texture data, mapped onto the representative digital 3D model.

The representative digital 3D model may include at least one of the first digital 3d model, the copy of the first digital 3d model, the second digital 3d model, or the copy of the second digital 3d model. The first digital 3d model or the copy of the first digital 3d model may include or is devoid of the first texture data. Similarly, the second digital 3d model, or the copy of the second digital 3d model may include or is devoid of the second texture data. Typically, it is preferred that the representative digital 3d model includes digital 3d model relating to the last acquired texture data, such digital 3d model may include or devoid of the last acquired texture data. In one embodiment, the velocity function may be generated for corresponding regions relating to the first texture data and second texture data. However, the velocity function may be generated for as an average for the whole tooth for which the representative model is to be developed. It is understood that the calculation of velocity function may also be based on first texture data and last acquired texture date over the first time point and the time point when the last texture data was acquired. Alternatively, the calculation of velocity function may be based on second texture data and last acquired texture date over the second time point and the time point when the last texture data was acquired. In some instances, the last acquired texture data is the second texture data, thus the time point of the last acquired texture data is the second time point. In different embodiments, as disclosed earlier, the comparison of the future texture data and last acquired texture data for the patient is based on direct comparison of the texture data or indirect comparison of the texture data by way of a scoring function. In different embodiments, the velocity function is the rates of change, as disclosed earlier. In different embodiments, the velocity function is defined by a linear rate function or non-linear rate function defining the development of caries between the first time point and second time point.

In an embodiment, the method includes presenting at least one of the first digital 3D model, the second digital 3D model or the digital 3D model representing development of caries in a time sequence, wherein the first digital 3D model and the second digital 3D model are placed in the common texture space. Such representation may be particularly helpful to see development of caries over a period of time. The first digital 3D model and the second digital 3D may be arranged in the time sequence in accordance with the time stamps associated with when the scan that resulted in the first digital 3D model and second digital 3D model was taken.

Placing the first digital 3D model and the second digital 3D model in the common texture space may be understood as the first texture data and the second texture data being placed in the common texture space.

In an embodiment, corresponding regions in the first digital 3D model and the second digital 3D model comprises regions from the two representations that are positionally related when the first digital 3D model and the second digital 3D model are placed in a common coordinate system.

Placing the first digital 3D model and the second digital 3D model in the common coordinate system refers to bringing the two models in at least substantially alignment. This may be achieved by alignment techniques that are described later in the disclosure. In order to identify corresponding regions or comparable regions between the first digital 3D model and second digital 3D model, the models may be first brought into the common coordinate system. During such placement of the models in the common coordinate system, one model may be overlaid or superimposed over another model.

The term "positionally related" regions refer to regions having at least one of anatomical relationship (e.g. correspondence) or spatial relationship (e.g. correspondence) with one another. Such anatomical relationship be based on landmarks such as buccal groove, distal pit, lingual groove, mesiolingual cusp, lewis offset, distal cusp, etc.

Placing the first digital 3D model and second digital 3D model in the same coordinate system may be performed automatically or with user intervention. Alignment, by way of placing models in the same coordinate system, may be determined from a transformation matrix that locally and/or globally aligns the first digital 3D model and second digital 3D model. In an embodiment, both the first digital 3D model and second digital 3D model are segmented, and each tooth from the two models is automatically or manually assigned an identifier based on the its characteristics such as shape, features like landmarks and position of each tooth. Once correspondence between the tooth in the two models is established based on the identifier, the tooth with same identifier from the two models are individually aligned. Any variation in tooth arches in the two models may be adjusted by way of a balancing step such as distributing the variation evenly on either side of the arch. In another embodiment, the user may select more than 2 corresponding points on the digital 3D models, such corresponding points represent points that are substantially stationary, i.e. haven't moved, in the two models between the first time point and second time point. The models are brought into at least substantial alignment through alignment of the corresponding points. This may be further supplemented by selecting a region in at least one of the models, the region representing a section that has remained substantially stationary, i.e. hasn't moved, such as a part of rugae in the two models between the first time point and second time point. The two models are further aligned in view of the selection of the non-moveable region such as rugae. In yet another alignment, the models may be aligned manually by overlaying one model over another, the user can manually move one model in different degrees of freedom until the user is satisfied with the alignment.

In some embodiments, the method comprises a globally aligning the first and second digital 3D models. This is advantageous e.g. when the method is for monitoring changes in the development of caries of an individual teeth, where a direct comparison between the teeth parts of the globally aligned digital 3D models may be used to detect any caries development over time. The alignment provides that the spatial correspondence between the digital 3D models is determined.

In some embodiments, the global alignment is based on parts of the digital 3D models corresponding to parts of the set of teeth which most likely are at least substantially stationary, i.e. have not changed/moved, during the time elapsed between the first and second digital 3D models where recorded. For instance, the rugae in the patient's upper jaw can be used in the global alignment of the digital 3D models as well as teeth which are not expected to move, such as the patient's molar teeth during an orthodontic treatment correcting the position of the anterior teeth only. The global alignment may e.g. be based on 3 points defined on corresponding parts of the digital 3D models, on operator selected areas of the digital 3D models, or on the teeth of one or more of the quadrants in the patient's set of teeth.

For a series of digital 3D models the alignment may comprise aligning each digital 3D models with the previous digital 3D models in the series, i.e. the closest earlier digital 3D models. In some cases, it may however also be advantageous to allow the operator to decide which of the previous digital 3D models a given digital 3D models should be aligned with.

In some embodiments, the method comprises locally aligning segmented teeth of the first and second digital 3D models. In the context of the present application the phrase "locally aligning segmented teeth" refers to the situation where one or more of the segmented teeth of one digital 3D models are individually aligned with the corresponding teeth of the other digital 3D models. The local alignment may be realized by aligning corresponding digital 3D models of the teeth segmented from the digital 3D models, such as e.g. aligning digital 3D models of a canine tooth segmented from the digital 3d models. The 3D models of the segmented teeth of the first digital 3d model are thus aligned with the corresponding 3D models of the teeth in the second digital 3d model on a tooth to tooth basis. i.e. the alignment is local on the scale of the individual teeth rather than on the global scale of the entire set of teeth. There transformations used for aligning different segmented teeth may thus be different in contrast to a global alignment where the same transformation is applied to all the teeth and the gingiva.

The local alignment of the 3D models of the segmented teeth provides the advantage that corresponding teeth of the digital 3D models may be aligned accurately regardless of any relative movement of the teeth in between the recording of the digital 3D models. A true anatomical correspondence between teeth of the digital 3D models may thus be obtained.

The comparable regions or corresponding regions may be identified in a number of ways. In one embodiment, the first digital 3D model and the second digital 3D model are overlaid over one another and brought in the common coordinate system.

Thereafter, one of the first digital 3D model or the second digital 3D model is selected as a primary model. At least one vector is drawn from a region of the primary model and a region in the non-selected representation where the at least one vector intersects the non-selected model is identified. The region of the primary representation from where the at least one vector is drawn and the identified region of the non-selected representation where the at least one vector intersects are identified as comparable regions or corresponding regions.

In another embodiment, the comparable regions or corresponding regions may be identified based on the following process. A point Mi from a region of a tooth crown surface of one of the first digital 3D model or the second digital 3D model is selected. Next, at least one closest point Ni, for the point Mi, on at least one region of the tooth crown surface on another of the second digital 3D model or first digital 3D model satisfying a predefined criterion is identified. The predefined criterion may include a calculated sum of the distance from Mi to Ni, where the calculate sum is below a predefined threshold. In a scenario where more than one-points Ni for a single point Mi are identified to meet the predefined criterion, an elimination routine to select one the relevant point Ni may be used. For example, the elimination routine may be based on selecting the closest point Ni (i.e. relevant point Ni) having the minimum calculated sum of the distance from Mi. The region containing the point Mi and region containing the point Ni satisfying the predefined criterion or the relevant point Ni define comparable regions or corresponding regions. Other elimination routines may also be employed such as an angle that a distance vector from point Mi forms with the facet of another model at point Ni (i.e. relevant point Ni) meets a predefined angle threshold, are also within the scope of this disclosure. Such elimination routine may also include combined elimination routine, for example satisfaction of more than one criterion like the disclosed minimum calculated sum criterion and disclosed angle of the distance vector criterion. In another embodiment, identification techniques based on feature such as landmark comparison between the two models may be applied in order to identify regions that are anatomically corresponding to each other. Thus, the corresponding regions or comparable regions are anatomically related regions.

In an embodiment, one of the first digital 3d model or second digital 3d model may be selected a reference model and another of the first digital 3d model or second digital 3d model is a non-reference model. After the models are placed in the common coordinate system, a region from the reference model may overlap with one or more regions of the non-reference model. In one embodiment, the comparable regions or corresponding regions include the region from the reference model and a region from the non-reference model having maximum overlap with the reference region. In another embodiment, the comparable regions or corresponding regions include the region from the reference model and all regions that overlap with the reference region. In another embodiment, the comparable regions or corresponding regions include the region from the reference model and a subset of all regions that overlap with the reference region, the subset being defined by a selection threshold such as minimum percentage of overlap of the overlapping region from the non-reference model with the region from the reference model. In embodiments where a region from reference model, i.e. reference region overlaps with more than one regions from the non-reference model, the texture value and/or classification score of the region from the reference model is compared with one of i) the texture value and/or classification score of a region having maximum overlap with the reference region, ii) average or weighted average of the texture value and/or classification score of all regions that overlap with the reference region, or iii) average or weighted average of the texture value and/or classification score of a subset of all regions that overlap with the reference region. The weighted average may be calculated based on a certain criterion such as individual percentage of overlap of overlapping regions from the non-reference model with the region from the reference model. Other criterion for calculating weighted average may also be used and within the scope of this disclosure.

It may be noted that the identification of comparable regions for uniformizing texture and corresponding regions for comparison of texture data may be made by employing same technique or different techniques. The techniques, disclosed in different embodiments, for identification of comparable regions may also be employed for identification of comparable regions in general, e.g. for determining the set of severity differences or for mapping, i.e. overlaying the set of severity differences.

Selecting corresponding regions or comparable regions on the aligned 3D tooth models provides the advantage that a spatially and/or anatomically related regions between the models may be compared. Determining the at least one texture modifying parameter or development of caries between different points in time on tooth surface provides for a more accurate measure.

The detection of the development of caries by comparing texture data from two digital 3D models acquired at different points in time may be extended to comparing several digital 3D models and to monitor the development of caries in the patient's teeth over time. The monitoring may involve several other digital 3D models recorded in between, before and/or after the first and second digital 3D models such that a plurality of digital 3d models is recorded. The comparison can then e.g. be between two subsequently acquired digital 3D models or between the latest acquired digital 3D models and the first digital 3D models acquired for the patient. In the first example the development since the last visit at the clinic may be detected. In the second example, an overall development since the beginning of the monitoring is detected. In some cases, it may however also be advantageous to allow the operator to decide which of the previous digital 3D model a given digital 3D model should be compared with. In some embodiments, the user interface configured for implementing the disclosed method provides that the operator can decide which of several obtained digital 3D models should be compared.

The method may further include segmentation of the first and second digital 3D models, typically prior to the comparison of the first texture data and second texture data. The segmentation identifies the parts of the first and second digital 3D models corresponding to different teeth. The segmentation provides that the identified teeth and the gingiva may be separated and treated as independent 3D parts of the individual teeth and the gingiva. Also, such segmentation allows for comparing same dental objects or regions in same dental objects in the first digital 3D model and second digital 3D model.

According to an embodiment, a method for generating a digital three-dimensional (3D) model representing dental caries for a tooth is disclosed. The method includes
- obtaining a digital 3D model of teeth of a patient, the digital 3D model comprising the tooth;
- obtaining fluorescence data in response to illuminating the tooth with a probe light comprising light at a first wavelength that is capable of exciting a fluorescent material of the tooth;
- applying a scoring function on the obtained fluorescence data to obtain tooth region specific score value; and
- overlaying the score value as a visual indication on the obtained digital 3D model comprising a texture data or devoid of the texture data, wherein the visual indication of score value represents presence or absence of caries.

The scoring function may include a mathematical relationship comprising one of i) different texture components of a region from a texture data, ii) a single texture component of a region from a texture data, iii) same or different texture component(s) of different regions from a texture data, or iv) a single texture component of a region from a first texture data and different texture components of a region from second texture data.

In some embodiments, the first wavelength is in the range of 250 nm to 500 nm, such as in the range of 350 nm to 450 nm. In some embodiments, the light source emitting light at first wavelength is LED emitting blue or violet colored light which may be used for exciting fluorescent materials of teeth.

In an embodiment, the identification function is based on a distance between the texture data of the region being inspected for presence of the dental condition and the texture data of the healthy region in a texture space. The distance may represent a deviation of the texture components of the region from those of the healthy region. The distance may include an Euclidean distance, where the texture components of the texture data represent different dimensions of the texture space. For example, a deviation from a healthy region may be defined as the Euclidean distance in color space. In one embodiment, such distance for the fluorescence data and color data, may be expressed as $$\Delta fluo = \sqrt{(r_{fluo,h} - r_{fluo})^2 + (g_{fluo,h} - g_{fluo})^2},$$

$$\Delta rgb = (r_h - r)^2 + (g_h - g)^2 + (b_h - b)^2.$$

In another embodiment, such distance for the fluorescence data and color data, may be expressed as $$\Delta fluo = \sqrt{(g_{fluo,h} - g_{fluo})^2},$$

$$\Delta rgb = (r_h - r)^2 + (g_h - g)^2 + (b_h - b)^2.$$

$r_{fluo,h}$ and $g_{fluo,h}$ are respective values of red and green texture components of the fluorescence data from the healthy region, $r_{fluo}$ and $g_{fluo}$ are respective values of red and green texture components of the fluorescence data from the region, $r_h$, $g_h$, and $b_h$ are respective values of red, green, and blue texture components of the color data from the healthy region, r, g, and b are respective values of red, green, and blue texture components of the color data from the region.

The identification function may define a mathematical relationship comprising at least one texture component of the color data and at least one texture component of the fluorescence data from the region, and at least one texture component of the color data and at least one texture component of the fluorescence data from the healthy region. In an embodiment, the at least one texture component of the fluorescence data from the region and/or healthy region in the identification function comprises only at least one of red texture component or green texture component. The identification function may be devoid of blue texture component of the fluorescence data.

In an embodiment, the identification function is expressed as $$IV(\Delta fluo, \Delta rgb) = \sqrt{\Delta fluo^2 + \Delta rgb^2}$$

$$IV = \sqrt{(r_{fluo,h} - r_{fluo})^2 + (g_{fluo,h} - g_{fluo})^2 + (r_h - r)^2 + (g_h - g)^2 + (b_h - b)^2}.$$

where IV is identification value, $r_{fluo,h}$ and $g_{fluo,h}$ are respective values of red and green texture components of the fluorescence data from the healthy region, $r_{fluo}$ and $g_{fluo}$ are respective values of red and green texture components of the fluorescence data from the region, $r_h$, $g_h$, and $b_h$ are respective values of red, green, and blue texture components of the color data from the healthy region, r, g, and b are respective values of red, green, and blue texture components of the color data from the region.

In another embodiment, the identification function is expressed as $$IV(\Delta fluo, \Delta rgb) = \sqrt{\Delta fluo^2 + \Delta rgb^2}$$

$$IV = \sqrt{(g_{fluo,h} - g_{fluo})^2 + (r_h - r)^2 + (g_h - g)^2 + (b_h - b)^2}.$$

where IV is identification value, $g_{fluo,h}$, is value of green texture component of the fluorescence data from the healthy region, $g_{fluo}$ is value of green texture component of the fluorescence data from the region, $r_h$, $g_h$, and $b_h$ are respective values of red, green, and blue texture components of the color data from the healthy region, r, g, and b are respective values of red, green, and blue texture components of the color data from the region, The severity function defines a mathematical relationship comprising a texture component of the fluorescence data from the region and same texture component of the fluorescence data from the healthy region. In an embodiment, the severity function is different from the identification function. The severity function may be expressed as $$SV = \frac{g_{fluo}}{g_{fluo,h}}$$

where SV is the severity value $g_{fluo,h}$, is value of green texture component of the fluorescence data from the healthy region, $g_{fluo}$ is value of green texture component of the fluorescence data from the region, Applying the identification function may include using, in the identification function, texture component value(s) from the region being inspected for presence of the dental condition and the identified healthy region. Similarly, applying the severity function may include using, in the severity function, texture component value(s) from the region being inspected for presence of the dental condition and healthy region. The region is the region that is inspected for the presence of the dental condition.

The texture component value from the healthy region comprises a texture component value from the healthy region or a value derived from texture component values of more than one identified healthy region. In the latter implementation where the texture value may be derived from more than one identified healthy regions, such derivation may include calculating one of an average, a weighted average, median, a mode of texture values from the more than one healthy region.

The identification threshold criterion may include a threshold value, which may be used to identify the presence of dental condition. Depending upon selection of the threshold value, the identification value higher or lower than the threshold value may be identified as the presence of dental condition. Alternatively, the identification threshold criterion may include a value range, and identification value falling within the range is identified as presence of the dental condition.

In an embodiment, a level of severity of the dental condition is determined based on the determined severity value satisfying a severity threshold criterion. The severity threshold criterion may include a threshold value, which may be used to determine the level of severity. Alternatively, the identification threshold criterion may include different value ranges, and severity value falling within a specific range is determined as a level of severity. For example, the level of severity may be categorized in initial, moderate and severe categories. Such categorization may be applied and mapped in a similar way disclosed in relation to the classification of classification score in different ranges and represented as different colors, as also described by way of Table 2.

The threshold criterion in relation to identifying whether a region comprises a dental condition, the levels of severity or development of dental condition may be determined by using different approaches. For example, for each function (e.g. identification, or severity or scoring), one or more of visual-tactile, radiographic methods, or histological assessments on test teeth or test jaw models may be performed in order to define function specific threshold criterion or ranges for categorizing lesion or differences or range. A reference is made to Anahita Jablonski-Momeni et al. "*Use of ICDAS-II, Fluorescence-Based Methods, and Radiography in Detection and Treatment Decision of Occlusal Caries Lesions: An In Vitro Study*" Int. J Dent. 2012; 2012: 371595.

In an embodiment, generating the virtual three-dimensional model comprising the visual indicator comprises mapping region specific severity value or level of severity onto at least a part of the obtained first digital 3d model or a copy thereof. The first digital 3d model or a copy thereof including the mapped severity value or mapped level of severity may include at least one of the texture data or is devoid of any of the texture data relating to the first digital 3D model.

In an embodiment, a second digital 3D model of a patient's set of teeth and region-specific texture data comprising fluorescence data and color data corresponding to different regions of the second digital 3D model is obtained. The second digital 3D model and region-specific texture data is obtained at a second time point different than a time point at which the first digital 3D model and region-specific texture data corresponding to different regions of the first digital 3D model was obtained. A region containing the dental condition based on an identification value satisfying an identification threshold criterion may be identified for the second digital 3D model. The identification value may be calculated by applying the identification function on the texture data associated with the region of the second digital 3D model. Furthermore, a severity value may be determined by applying a severity function on at least one of the data comprised in the texture data associated with the region identified as the region of the second digital 3D model containing the dental condition.

In an embodiment, a set of severity differences between the severity values for corresponding regions between the first digital 3D model and the second digital 3D model are calculated; and a digital 3D model comprising the set of severity differences is generated. The set of severity differences may be represented with a visual indicator, for example as an overlaid region specific heat map comprising different colors. The severity differences may be categorized in different categories in accordance with the magnitude of the difference, for example in small change, mild change, moderate change and major change. Such categorization may be applied and mapped in a similar way disclosed in relation to the texture difference value categorized in different ranges and represented in different colors, as also described by way of Table 3. As the severity values for each model are calculated in relation to healthy regions from the same model, this approach is immune to influence from ambient light conditions under which the models or texture data are obtained because the healthy region and the region inspected for presence of the dental condition and severity are subject to the same light condition. Therefore, even if the first digital 3D model and the second digital 3D model are obtained under different ambient light conditions, the determined severity values between the two models may be compared without the need of uniformizing textures.

In an embodiment, the corresponding regions from the first digital 3D model and second digital 3D model are positionally related, i.e. spatially related regions and/or anatomically related regions. The corresponding regions between the first digital 3D model and the second digital 3D model may be identified by individually segmenting the first digital 3D model into individual dental objects and the second digital 3D model into individual dental objects. This is followed by identifying corresponding dental objects from the segmented first digital 3D object and segmented second digital 3D model, and locally aligning the identified corresponding dental objects. The corresponding regions are identified by identifying aligned regions in the locally aligned corresponding dental objects. Different embodiments relating to positionally related regions are described earlier in the disclosure.

The corresponding dental objects may be identified in a number of ways. In an embodiment, the first digital 3D model and the second digital 3D model are globally aligned such as by using at least three corresponding points from the two models, the points preferably being selected from non-moving portions of the two models. The corresponding points may be aligned by using Iterative Closest Point (ICP) technique, thereby globally aligning the two models. The two models are individually segmented, and a vector (e.g. normal vector from a surface) from a dental object of the first digital 3D model is projected onto the second digital 3D model. The dental object of the second digital 3D model onto which the vector intersects is identified as the corresponding dental object to the dental object of the first digital 3D model from which the vector is projected. In another embodiment, the corresponding dental objects may be identified by applying feature detection techniques that allows for detecting features of the segmented dental objects in the two models, thereby allowing to identify dental objects from the two models representing at least substantially same feature set such as landmarks. Thus, the corresponding dental objects include dental objects from the first digital 3D model and second digital 3D model having the at least substantially same feature set. Locally aligning the identified corresponding dental objects and identification of corresponding regions is described later.

In an embodiment, generating the digital 3D model comprising the set of severity differences includes mapping region specific severity difference onto at least a part of the obtained first digital 3d model or a copy thereof. The first digital 3d model or a copy thereof comprising the set of severity differences includes the at least one of the texture data or is devoid of any of the texture data relating to the first digital 3D model. Additionally or alternatively, generating the digital 3D model comprising the set of severity differences includes mapping region specific severity difference onto at least a part of the obtained second digital 3d model or a copy thereof. The second digital 3d model or a copy thereof comprising the set of severity differences includes the at least one of the texture data or is devoid of any of the texture data relating to the second digital 3D model. The mapped differences may be presented as a visual indicator such as pointer or heat map having different properties (eg. color) for differences falling in different ranges.

In an embodiment, for more than one corresponding regions, rates of development of the dental condition based on the severity differences and time span between the obtaining of the texture data corresponding to the first digital 3D model and texture data corresponding to the second digital 3D model is determined. Furthermore, a digital 3D model comprising the rates of development of the dental condition may be generated. The rates of development may be represented with a visual indicator, for example as an overlaid region-specific heat map comprising different colors. The severity differences may be categorized in different categories in accordance with the magnitude of rates, for example in small rate, mild rate, moderate rate and major rate. Such categorization may be applied and mapped in a similar way disclosed in relation to the rate of change categorized in different ranges and represented in different colors, as also described by way of Table 4.

In an embodiment, generating the digital 3D model includes mapping region specific rates of development of the dental condition onto at least a part of the obtained first digital 3d model or a copy thereof. The first digital 3d model or a copy thereof comprising the set of severity differences includes the at least one of the texture data or is devoid of any of the texture data relating to the first digital 3D model. Additionally or alternatively, generating the digital 3D model includes mapping region specific rates of development of the dental condition onto at least a part of the obtained second digital 3d model or a copy thereof. The second digital 3d model or a copy thereof comprising the set of severity differences includes the at least one of the texture data or is devoid of any of the texture data relating to the second digital 3D model. The mapped rates may be presented as a visual indicator such as pointer or heat map having different properties (eg. color) for rates falling in different ranges.

Because the determined value such as the severity value, level of severity, and severity difference are region specific, the recited mapping includes overlaying or superimposing the determined value over the specific region. Such overlaying or superimposing allows for representing the determined value on the digital 3D model by way of a visual indications such as colors or markings. The mapping may be performed by applying mapping technique that is disclosed in one or more earlier disclosed embodiments.

According to an embodiment, a data processing system is disclosed. The data processing system includes modules or computation units such as a hardware processor that are configured to perform one or more steps of the method disclosed in one or more embodiments of this disclosure. The data processing system may include other modules such as memory.

According to an embodiment, a computer program product embodied in a non-transitory computer readable medium is disclosed. The computer program product includes computer readable program code being executable by a hardware data processor to cause the hardware data processor to perform a method when said computer readable program code is executed by the hardware data processor. The method may include one or more functions that allow one or more system components to perform one or more steps of the method disclosed in one or more embodiments of this disclosure.

BRIEF DESCRIPTION OF THE DRAWINGS

The embodiments of the disclosure, together with its advantages, may be best understood from the following illustrative and non-limiting detailed description taken in conjunction with the accompanying figures in which FIG. 1 illustrates a method for presenting the plurality of scans in a time sequence according to an embodiment;

FIG. 2 illustrates a method for generating a digital three-dimensional model according to an embodiment;

FIG. 3 illustrates a method for displaying digital models according to an embodiment;

FIG. 4 illustrates a method for placing digital 3D models in common texture space according to an embodiment;

FIG. 5 illustrates a method for generating a digital three-dimensional (3D) model according to an embodiment;

FIG. 6 illustrates a method for identifying corresponding regions or comparable regions according to an embodiment;

FIG. 7 illustrates a method for generating a representative digital 3D model according to an embodiment;

FIG. 18 illustrates a method for identifying a healthy dental region according to an embodiment;

FIG. 19 illustrates a method for identifying a healthy dental region according to several embodiments;

DETAILED DESCRIPTION

In the following description, reference is made to the accompanying figures, which show by way of illustration how the invention may be practiced.

FIG. 1 illustrates a method for generating 3D graphical models of an oral situation of a patient over time according to an embodiment. The method 100 includes at 102, obtaining a plurality of scans, each scan representing the oral situation of the patient at a specific time, where each scan comprises texture data. At 104, at least one texture modifying parameter is determined, and at 106, the texture of at least one, preferably each, of the respective plurality of scans is modified based on the one of the at least one texture modifying parameter. Thereafter at 108, the plurality of scans the texture of which are modified in step 106 are presented in a time sequence.

FIG. 2 illustrates a method for generating a digital three-dimensional (3D) model representing development in dental condition such as caries for a tooth for generating a digital three-dimensional model according to an embodiment. The method 200 includes, at 202, obtaining, at a first time point, a first digital 3D model of a patient's set of teeth including first texture data; and at 204, obtaining, at a second time point, a second digital 3D model of the patient's set of teeth including second texture data. At 206, the first digital 3D model including the first texture data and second digital 3D model including the second texture data are placed in a common texture space by uniformizing texture. Thereafter, at 208, the digital three-dimensional model representing development in dental caries based on a comparison of the first texture data and the second texture data of corresponding regions in the first digital 3D model and the second digital 3D model placed in the common texture space is generated.

Figures 14A, 14B:
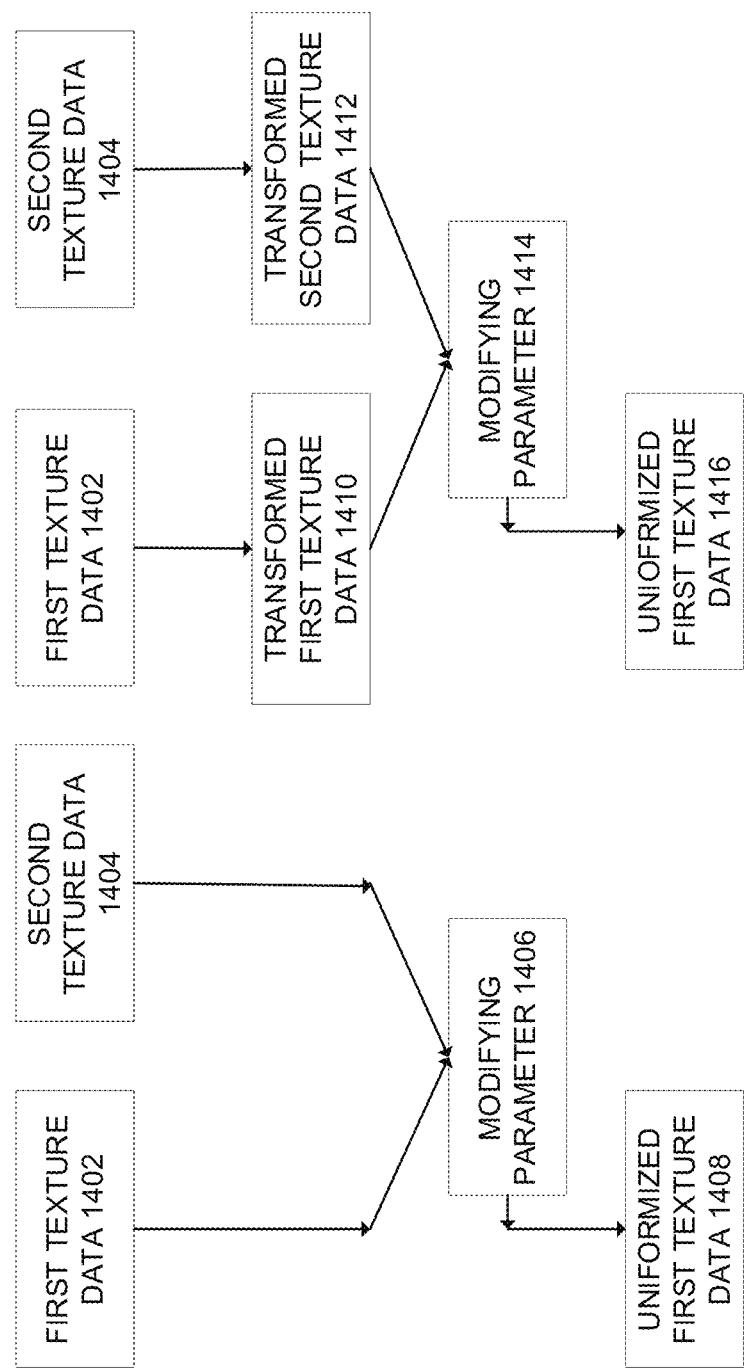
FIG. 14A illustrates a method of uniformizing texture according to an embodiment.
FIG. 14B illustrates a method of uniformizing texture according to an embodiment.

Referring to FIG. 14A, which illustrates a method of uniformizing texture according to an embodiment. The first texture data 1402 and second texture data 1404, for comparable regions, are directly used in accordance with the disclosure to determine at least one texture modifying parameter 1406. The texture modifying parameter 1406 may be applied to at least one of the at least one of the first texture data and second texture data, for example to the first texture data 1402 for generating a uniformized first texture data 1408, which is in the common texture space as the second texture data 1404.

Referring now to FIG. 14B, which illustrates a method of uniformizing texture according to an embodiment. The first texture data 1402 and second texture data 1404, for comparable regions, are indirectly used in accordance with the earlier disclosure to determine at least one texture modifying parameter 1414. This requires first converting both the first texture data and second texture data to a texture space (e.g. LAB color space) that is different from the texture space (e.g. RGB color space) in which the first texture data and second texture data are available. Such transformation results in a transformed first texture data 1410 and transformed second texture data 1412. The transformed first texture data 1410 and transformed second texture data 1412 are directly used in accordance with earlier disclosure to determine the at least one texture modifying parameter 1414. The texture modifying parameter 1414 may be applied to at least one of the transformed first texture data or transformed second texture data, for example to the transformed first texture data 1402, which is then converted to the texture space (e.g. RGB color space) in which digital 3D models are to be visualized and compared. This results in a uniformized first texture data 1416, which is in the common texture space as the second texture data 1404.

FIG. 3 illustrates a method for generating digital three-dimensional (3D) models according to an embodiment. The method 300 includes at 302 obtaining, at a first time point, a first digital 3D model of a patient's set of teeth including first texture data; and at 304 obtaining, at a second time point, a second digital 3D model of the patient's set of teeth including second texture data. At 306, the first digital 3D model including the first texture data and second digital 3D model including the second texture data are placed in a common texture space by uniformizing texture.

Thereafter at 308, the first digital 3D model including the first texture data and second digital 3D model including the second texture data placed in a common texture space are displayed on a display unit.

FIG. 4 illustrates a method for placing digital 3D models in common texture space according to an embodiment. The method 400 includes at 402, selecting one of the first digital 3D model or second digital 3D model, and at 404 selecting at least one region from the selected digital 3D model, the selected region being used for texture calibration. At 406, comparable region on another model comprising one of the non-selected first digital 3D model or second digital 3D model is identified. At 408, at least one texture modifying parameter comprising transformation operator(s) based on the selected region of the selected model and comparable region of the non-selected another model is generated; and at 410, the at least one generated texture modifying parameter on the comparable region of the non-selected another model is applied.

FIG. 5 illustrates a method for generating a digital three-dimensional (3D) model representing dental caries for a tooth according to an embodiment is disclosed. The method 500 includes at 502, obtaining a digital 3D model of teeth of a patient, the digital 3D model comprising the tooth; and at 504, obtaining fluorescence data in response to illuminating the tooth with a probe light comprising light at a first wavelength that is capable of exciting a fluorescent material of the tooth. At 506, a scoring function on the obtained fluorescence data to obtain tooth region specific score value is applied. The scoring function comprises a mathematical relationship comprising one of i) different texture components of a region from a texture data, ii) a single texture component of a region from a texture data, iii) same or different texture component(s) of different regions from a texture data, or iv) a single texture component of a region from a first texture data and different texture components of a region from second texture data. Lastly, at 508, the score value as a visual indication is overlaid onto the obtained digital 3D model comprising a texture data or devoid of the texture data, wherein the visual indication of score value represents presence or absence of caries. It would be apparent to the skilled person that similar approach may be applied when severity function, instead of scoring function, and severity values, instead of score values, are overlaid as a visual indication on the obtained digital 3D model.

FIG. 6 illustrates a method for identifying corresponding regions or comparable regions in the first digital 3d model and the second digital 3d model. The method 600 includes at 602 overlaying one of the first digital 3d model or the second digital 3d model over another of the second digital 3d model or the first digital 3d model. At 604, one of first digital 3d model or the second digital 3d model is selected as a primary model. At 606, at least one vector from a region of the primary model is drawn and a region in the non-selected representation where the at least one vector intersects the non-selected representation is identified. Lastly, at 608, the region of the primary model from where the at least one vector is drawn and the identified region of the non-selected model where the at least one vector intersects are identified as the corresponding regions or comparable regions. It would be apparent to the skilled person that the disclosed approach may be used for one or more embodiments, that require identification of corresponding or comparable regions.

FIG. 7 illustrates a method for generating a representative digital 3D model comprising a future texture data according to an embodiment. The method 700 includes at 702, processing the first texture data and second texture data to determine a velocity function based on change in the texture data over the first time point and second time point. At 704, future texture data at a future time point based on the velocity function is determined, wherein the future texture data is determined prior to the patient's set of teeth reaching the future texture data. Lastly, at 706 a representative digital 3D model of patient's teeth is generated, wherein future development of dental caries is mapped onto the representative digital 3D model based on comparison of the future texture data and last acquired texture data for the patient. It would be apparent to the skilled person that the disclosed approach may be used for one or more embodiments, that require determination of a velocity function and generation of a digital 3D model comprising future texture data or dental condition.

Figure 8:
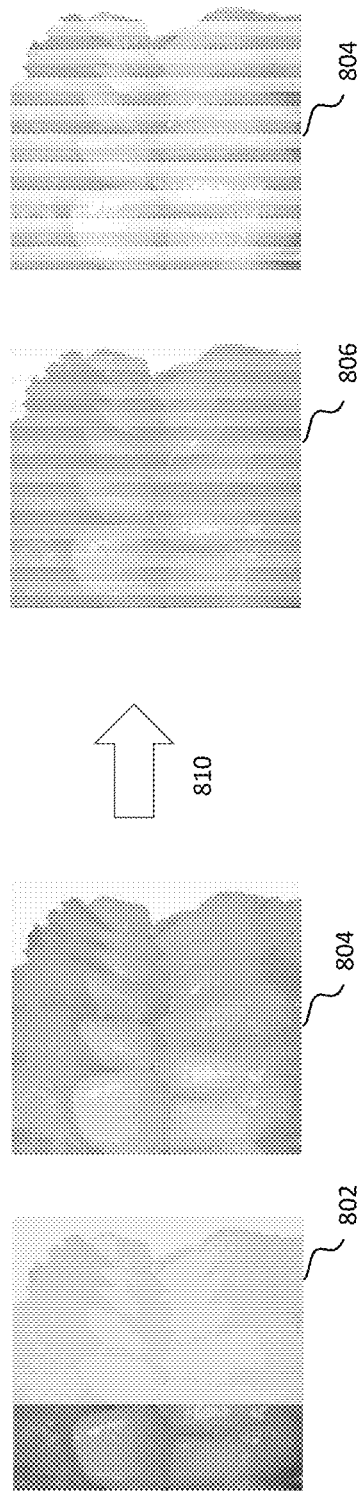
FIG. 8 illustrates two digital 3D models, obtained at different timepoints, with texture data placed in a common texture space according to an embodiment.

FIG. 8 illustrates two digital 3D models, obtained at different timepoints, with texture data in a common texture space according to an embodiment. The first digital 3D model 802 and the second digital 3D model 804 are obtained at the first time point and second time point respectively. It may be observed that the first digital 3D model and the second digital 3D model have texture data that do not have uniformized texture. Therefore, in this example, the first digital 3D model undergoes a process 810, such as the method disclosed in FIG. 3 or FIG. 4, that modifies the first digital 3D model to generate a transformed model 806 such that both the first digital 3D model (in form of the transformed model) and the second digital 3D model are placed in the common texture space by uniformizing texture.

Figure 9A:
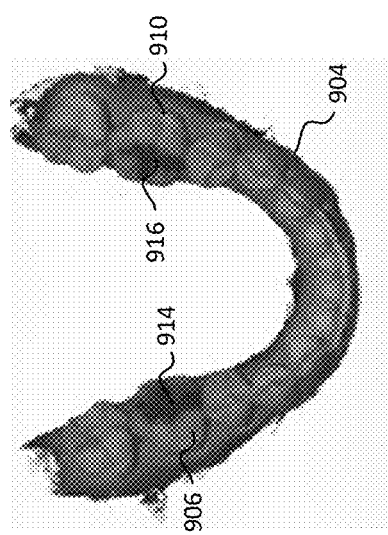
FIG. 9A illustrates a digital model, obtained at a time point, comprising texture data according to an embodiment.
Figure 9B:
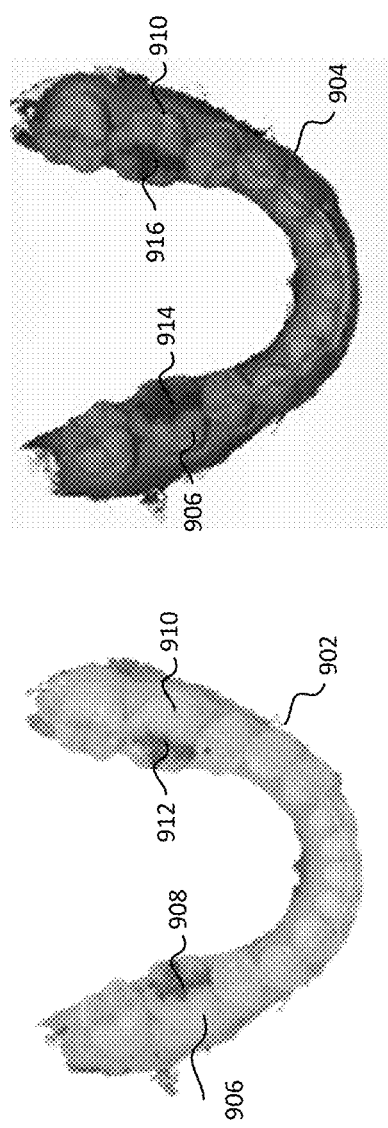
FIG. 9B illustrates a digital model, obtained at a time point, comprising texture data according to an embodiment.

FIG. 9A illustrates a digital model, obtained at a time point, comprising texture data according to an embodiment. The digital 3D model such as a first digital 3D model 902 includes texture data comprising color data. The texture data represents region 908 for tooth 906 and region 912 for tooth 910 that represent relatively darker regions such as in brown or black color. The darker regions may indicate presence of cariogenic regions. FIG. 9B illustrates a digital model, obtained at a time point, comprising texture data according to an embodiment. The digital 3D model such as a first digital 3D model 904 includes texture data comprising fluorescence data. The texture data represents region 914 for tooth 906 and region 916 for tooth 910 that represent relatively darker regions. The darker regions may indicate presence of cariogenic regions.

Figure 10:
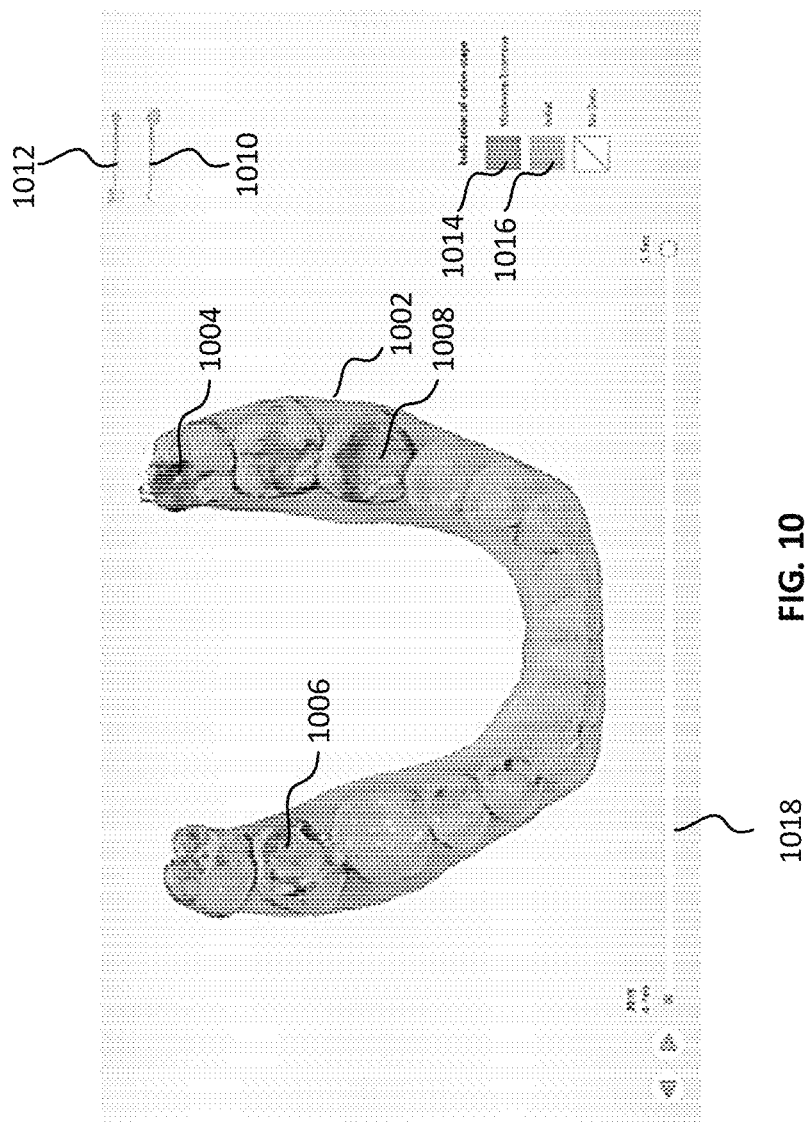
FIG. 10 illustrates mapped classification score overlaid on a digital 3D model according to an embodiment.

FIG. 10 illustrates mapped classification score overlaid on a digital 3D model according to an embodiment. The determined classification score may be mapped onto a digital 3D model 1002. Such classification score (1004, 1006, 1008) may be presented by way of different visual indications such as different colors depending upon the category (for example, initial or moderate) in which the score falls. For example, according to the associated colors 1014 and 1016 indicating moderate and initial caries respectively, the caries 1006 represents initial caries while 1004 and 1008 represent moderate caries. The digital 3D model may include texture data or may be devoid of texture data. A slider 1012 may be provided for changing transparency of the texture data. Similarly, a slider 1010 may be provided that allows for changing the transparency of the mapped classification score. The model may be represented in relation to a timeline 1018 such that the user may select the model for a specific time point. It would be apparent to the skilled person that the approach disclosed here may be utilized to map information such as severity values/level of severity on a digital 3D model, where the severity values/level of severity are presented with different visual indications such as colors depending upon the category the mapped information falls into. Similarly, other functionalities like slider, timeline or others may well be used in combination with mapping the information and is within the scope of this disclosure.

Figure 11:
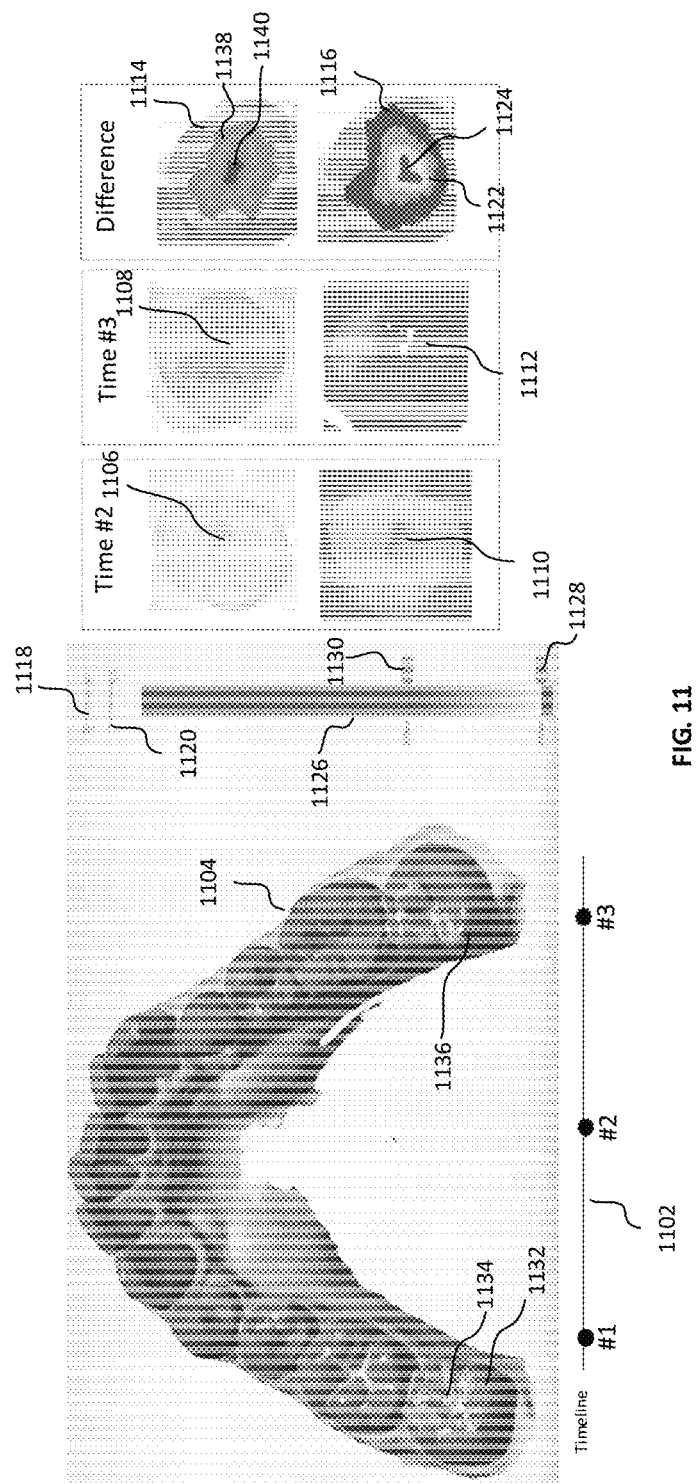
FIG. 11 illustrates mapped texture difference value overlaid on a digital 3D model according to an embodiment.

FIG. 11 illustrates mapped texture difference value overlaid on a digital 3D model according to an embodiment. A digital 3D model includes a plurality of teeth. For illustrative purposes, only one tooth is shown. At a first time point Time #2, the tooth includes color data representing at least a part 1106 of a first texture data and at a second time point Time #3, the tooth includes color data representing at least a part 1108 of a second texture data. Texture (color) difference values based on a difference of the at least a part 1106 and at least a part 1108 is calculated and mapped on to a digital 3D model of the tooth, as represented by 1114, 1138 and 1140. Based on the texture difference value based on color data, each value may be visually represented by a different color. Similarly, at a first time point Time #2, the tooth includes fluorescence data representing at least a part 1110 of a first texture data and at a second time point Time #3, the tooth includes fluorescence data representing at least a part 1112 of a second texture data. Texture difference values based on a difference of the at least a part 1110 and at least a part 1112 is calculated and mapped on to a digital 3D model of the tooth, as represented by 1116, 1122, 1124. Based on the texture difference value based on fluorescence data, each value may be visually represented by a different color. An illustrative digital 3D model 1104 representing development of caries includes the texture difference value (based on color data or fluorescence data) mapped onto the digital 3D model 1104. For example, for tooth 1132, the texture difference value 1134 is visually represented. Similarly, 1136 visually represents texture difference value for a different tooth of the digital 3D model 1104. The texture difference value may be represented in different colors based on the texture difference value and the color associated with a texture difference value range, which may be set or changed by using pointers 1128 and 1130 on a slide 1126. The transparency of texture data and/or texture difference value onto the digital 3D model may be varied by a slider control 1118 and 1120 respectively. The choice of which models and/or texture data needs to be compared for calculation of the texture difference value may be selected from the timeline 1102. It would be apparent to the skilled person that the approach disclosed here may be utilized to map the set of severity differences between the severity values of the first digital 3D model and second digital 3D model onto a digital 3D model, where the set of severity differences are presented with different visual indications such as colors depending upon the category the severity difference information falls into. Similarly, other functionalities like slide, slider control, timeline, others may well be used in combination with mapping the information and is within the scope of this disclosure.

Figure 12A:
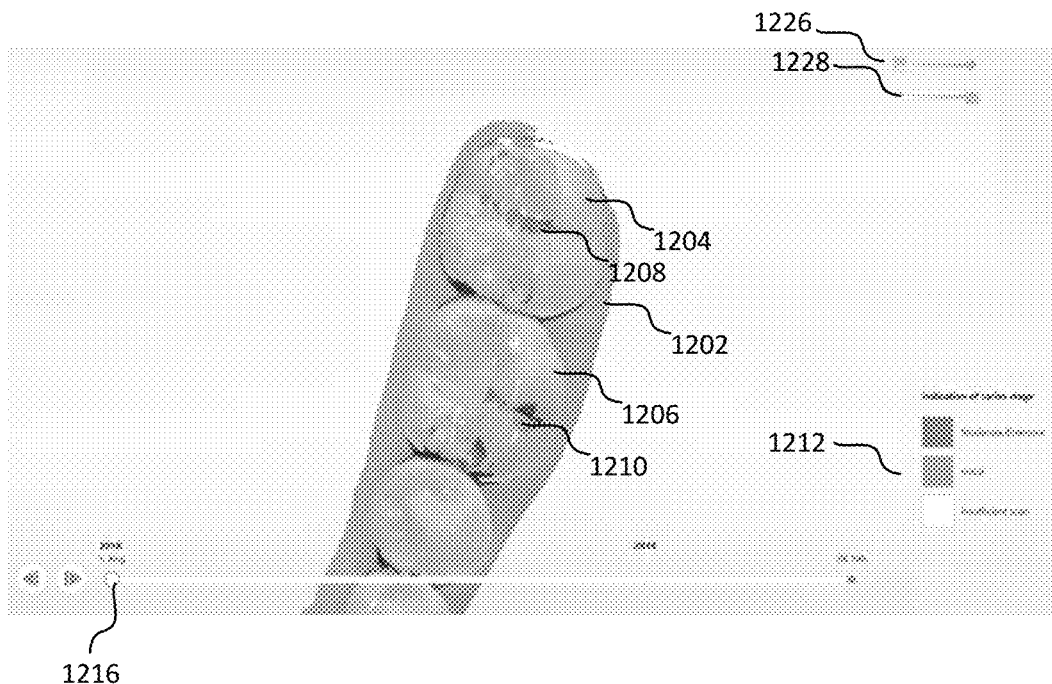
FIG. 12A illustrates mapped first set of classification score according to an embodiment.
Figure 12B:
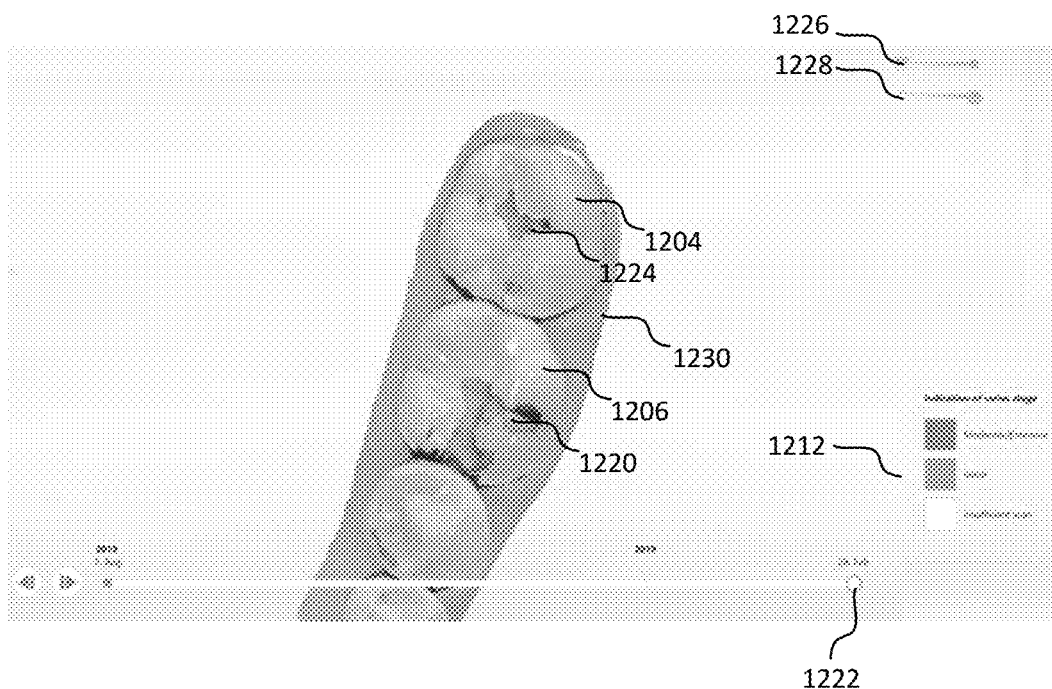
FIG. 12B illustrates mapped second set of classification score according to an embodiment.

As illustrated in FIG. 10, the classification score may be mapped on a digital 3D model. Similarly, FIG. 12A illustrates mapped first set of classification score according to an embodiment. For example, for a first time point 1216, the first set of classification score comprising classification score 1210 and 1208 for tooth 1206 and 1204 are mapped on a first digital 3D model 1202. In accordance with color scheme 1212, the representation of the classification score in different colors on the digital 3D model 1202 is an indication of severity of the caries. FIG. 12B illustrates mapped second set of classification score according to an embodiment. For example, for a second time point 1222, the second set of classification score comprising classification score 1220 and 1224 for tooth 1206 and 1204 are mapped on a second digital 3D model 1230. In accordance with color scheme 1212, the representation of the classification score in different colors on the digital 3D model 1230 is an indication of severity of the caries. The transparency of texture data and/or classification score onto the digital 3D model may be varied by a slider control 1226 and 1228 respectively. It would be apparent to the skilled person that the approach disclosed here may be utilized to map information such as severity values/levels of severity relating to a first time point 1216 and second time point 1222 on different digital 3D models respectively, where the severity values/levels of severity are presented with different visual indications such as colors 1212 depending upon the category the mapped information falls into. Similarly, other functionalities like slider, timeline and others may well be used in combination with mapping the information and is within the scope of this disclosure.

Figure 12C:
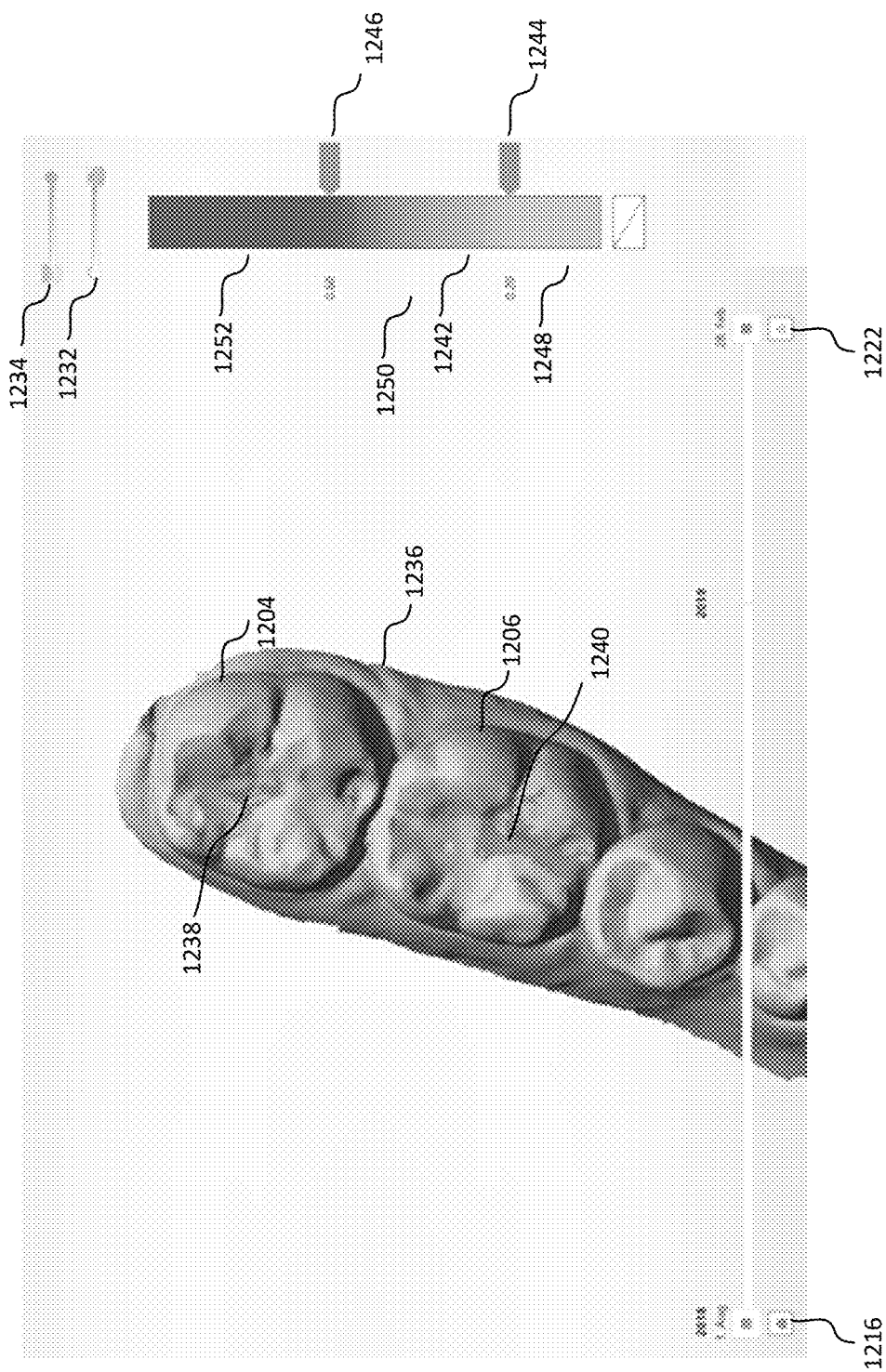
FIG. 12C illustrates mapped classification score difference according to an embodiment.

FIG. 12C illustrates mapped classification score difference according to an embodiment. The classification score difference based on the first set of classification score and the second set of classification score, as illustrated in FIG. 12A and FIG. 12B may be calculated and represented on a digital 3D model 1236 representing development of caries. For example, difference score 1240 represents difference in classification score 1220 and classification score 1210, and difference score 1238 represents difference in classification score 1224 and classification score 1208. The difference score is calculated based on the comparison of the first texture data and second texture data obtained at the first time point 1216 and second time point 1222 respectively. The transparency of texture data and/or difference score onto the digital 3D model 1236 may be varied by slider controls 1234 and 1232 respectively. The difference score may be represented in different colors based on the difference score and the color associated with difference score range, which may be set or changed by using pointers 1246 and 1244 on a slide 1250. The difference score range is illustrated by three ranges 1248, 1242, and 1252. It would be apparent to the skilled person that the approach disclosed here may be utilized to map the set of severity differences between the severity values of the first digital 3D model and second digital 3D model onto a digital 3D model, where the set of severity differences are presented with different visual indications such as colors depending upon the category the severity difference information falls into. Similarly, other functionalities like slide, slider control, timeline, others may well be used in combination with mapping the information and is within the scope of this disclosure.

Figure 13:
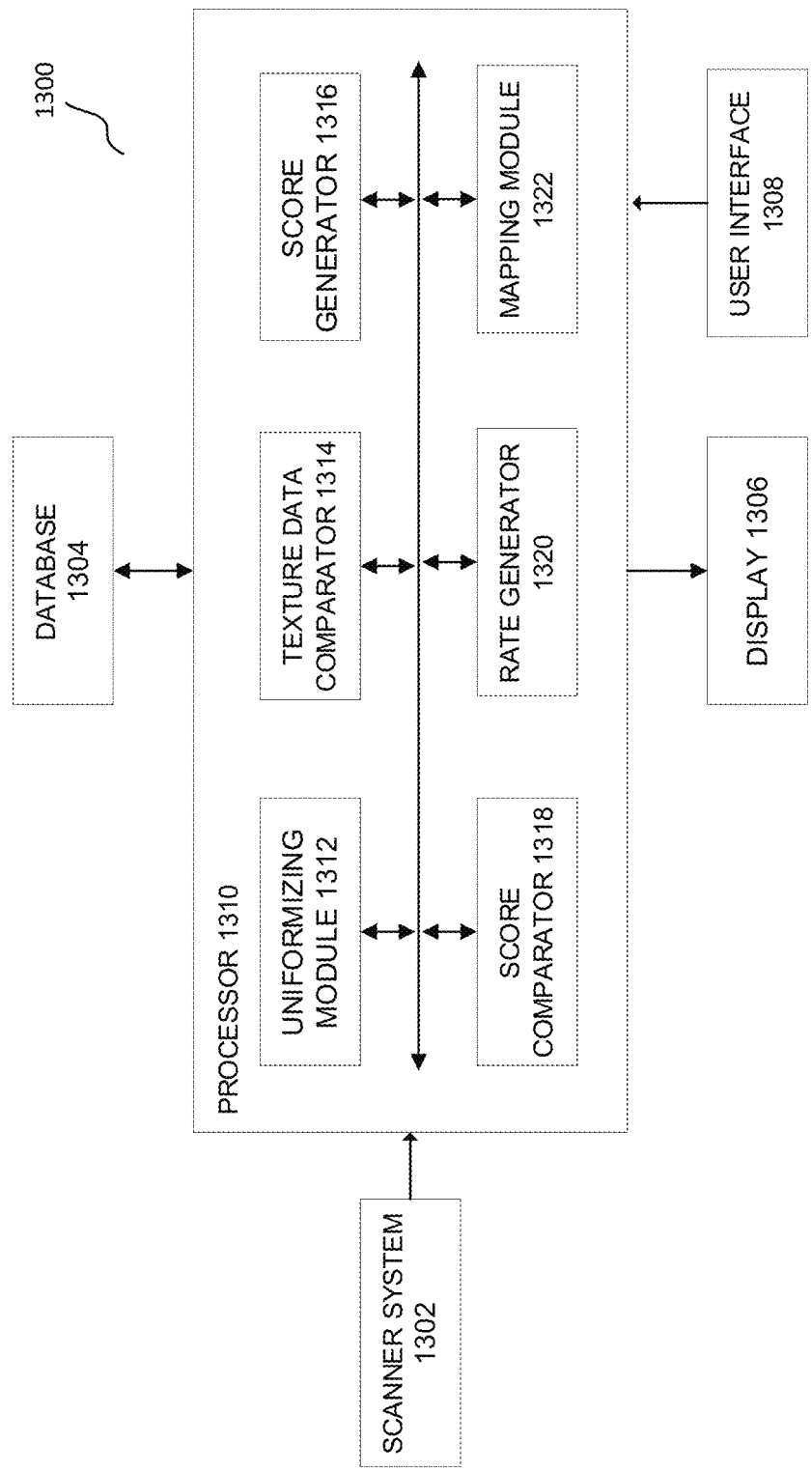
FIG. 13 illustrates a data processing system according to an embodiment.

FIG. 13 illustrates a data processing system according to an embodiment. The system 1300 includes a scanner system 1302 that is configured to generate a first digital 3D model having first texture data and a second digital 3D model having second texture data. The processor 1310 is configured to receive the first digital 3D model having first texture data and a second digital 3D model having second texture data. The models with respective texture data may be received from the scanner system 1302 and/or from a database 1304. The processor 1310 may include one or more of a plurality of means, but not limited to, a uniformizing module 1312, a texture data comparator 1314, a score generator 1316, a score comparator 1318, a rate generator 1320, or a mapping module 1322. The uniformizing module 1312 is configured to place the first digital 3D module and the second digital 3D module in the common texture space. The uniformizing module is thus configured to determine at least one texture modifying parameter and apply the determined at least one texture modifying parameter on at least one of the first texture data or second texture data. The texture data comparator 1314 is configured to calculate the texture difference value. The score generator 1316 is configured to determine a set of classification score based on the texture data. The score comparator 1318 is configured to calculate the difference score. The rate generator 1320 is configured to determine the rates of development or velocity function. The mapping module 1322 is configured to map information comprising one or more of the set of classification score, texture difference values, difference scores, rates of development, or future texture on a digital 3D model. The processor may include additional means for example means for automatically arrange the digital models in a time sequence along a time line, means for receiving user input at a user interface 1308 such as user input at transparency sliders (e.g. 1232 and 1234 in FIG. 12C or 1118 and 1120 in FIG. 11), or color range slider (e.g. 1250 in FIG.

12C or 1126 in FIG. 11), and means for generating different digital 3D models with mapped information. The processor unit is configured to provide the generated 3D models with mapped information on a display unit 1306. It must be apparent that a number elements are not listed but are within the scope of the disclosure, such as a memory, or corresponding/comparable region identifier.

Figures 15, 16, 17:
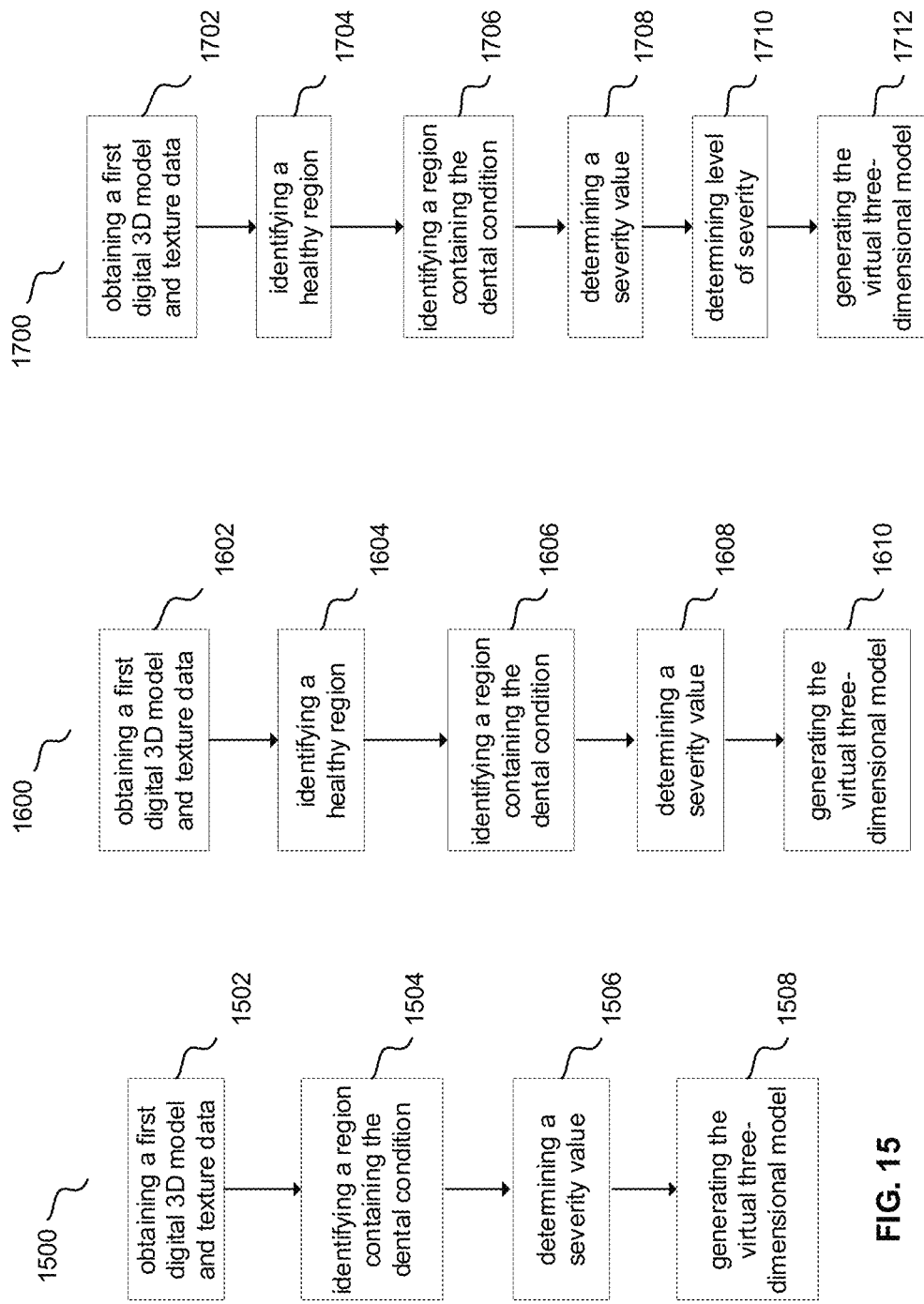
FIG. 15 illustrates a method for generating a virtual three-dimensional model representing a dental condition according to an embodiment.
FIG. 16 illustrates a method for generating a virtual three-dimensional model representing a dental condition according to an embodiment.
FIG. 17 illustrates a method for generating a virtual three-dimensional model representing a dental condition according to an embodiment.

FIG. 15 illustrates a method 1500 for generating a virtual three-dimensional model representing a dental condition according to an embodiment. The method includes obtaining, at 1502, a first digital 3D model of a patient's set of teeth and region-specific texture data corresponding to different regions of the first digital 3D model, the texture data comprising fluorescence data and color data. Thereafter, at 1504, a region containing the dental condition is identified. This is based on an identification value satisfying an identification threshold criterion, wherein the identification value is calculated by applying an identification function on the texture data associated with the region of the first digital 3D model. Once the region containing the dental condition is identified, then at 1506, a severity value is determined for at least one region that has been identified as the region containing the dental condition. This is performed by applying a severity function on at least one of the texture data associated with the identified region. Lastly, at 1508, the virtual three-dimensional model comprising a visual indicator based on the determined severity value for the region containing the dental condition such as caries is generated. The disclosed method is a computer implemented method.

FIG. 16 illustrates a method 1600 for generating a virtual three-dimensional model representing a dental condition according to an embodiment. The steps 1602, 1606, 1608, and 1610 are identical with already disclosed steps 1502, 1504, 1506, and 1508 (FIG. 15) respectively. In this embodiment, prior to identifying the region containing the dental condition at 1606, a healthy region is identified 1604. As disclosed earlier, such identification may be based on an evaluation of one or more texture components, as obtained from fluorescence data and/or color data.

FIG. 17 illustrates a method for generating a virtual three-dimensional model representing a dental condition according to an embodiment. The steps 1702, 1704, 1706, and 1708 are identical with already disclosed steps 1502 (FIG. 15), 1604 (FIG. 16), 1504, and 1506 (FIG. 15) respectively. At step 1710, a level of severity of the dental condition based on the determined severity value satisfying a severity threshold criterion is determined. At 1712, a virtual three-dimensional model is generated. The model includes a visual indicator comprises mapped region-specific level of severity onto at least a part of the obtained first digital 3d model or a copy thereof. The first digital 3d model or a copy thereof comprising the mapped severity value or mapped level of severity includes the at least one of the texture data or is devoid of any of the texture data relating to the first digital 3D model.

FIG. 18 illustrates a method 1800 for identifying a healthy dental region according to an embodiment. At 1802, a digital 3D model of a patient's set of teeth and region-specific texture data corresponding to different regions of the digital 3D model is obtained. The texture data includes at least one of fluorescence data or color data. At 1804, for at least one texture component of the obtained texture data, a reference value based on texture value distribution relating to the at least one texture component of the texture data is determined. Additionally or alternatively, for the texture data, a reference value based on texture value distribution relating to the texture data is determined at 1806. If the reference value is based on the at least one texture component, then at 1808, a region having respective value of texture component corresponding to the at least one texture component within a certain range of the determined reference value is determined as the healthy region. However, if the reference value is based on the texture data, then at 1808, a region having texture value within a defined range of the determined reference value is determined as the healthy region.

FIG. 19 illustrates a method 1900 for identifying a healthy dental region according to several embodiments. The steps 1902, 1906, 1908, and 1910 are similar to the steps 1802, 1804, 1806 and 1808 (FIG. 18), except that introduction of one or more of steps 1904 and 1912 influences the options available in later steps 1804, 1806, and 1808. In one embodiment, at 1904, prior to the determining the reference value, the obtained digital 3D model is segmented into individual dental objects and identifying the healthy region at individual tooth basis. The individual dental object may represent a plurality of individual tooth and gingiva and may also include non-tooth material like dental fillings and implants. This allows for utilizing texture value distribution specific to an individual dental object (i.e. at individual tooth basis) such as the tooth being inspected for presence of the dental condition, neighboring tooth, or same tooth type. In another embodiment, with or without combining with the preceding embodiment of segmenting the obtained digital 3D model, at 1912, a filtered texture value distribution is obtained by filtering out texture components or texture data having respective texture value outside a defined value range prior to the determining the reference value; and at 1906/1908 determination of the reference value is based on texture value distribution falling within the defined value range.

Figure 20A:
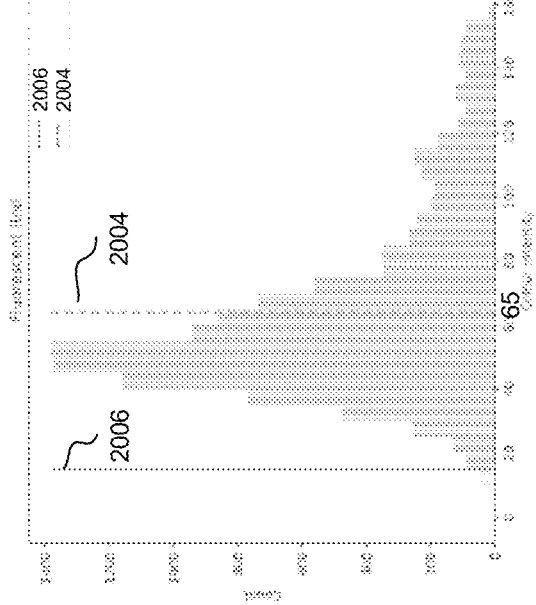
FIG. 20A illustrates determining a reference value for identifying healthy regions according to an embodiment.

FIG. 20A illustrates determining a reference value for identifying healthy regions according to an embodiment. The embodiment illustrates a texture value distribution 2000 as shown by the intensity distribution for a texture component (red channel from the fluorescent data) where the distribution represents histogram plotting number of regions such as facets (represented by counts) with their respective texture component value such as color intensity. A lower threshold 2006 is used for filtering the distribution, and a mathematical operation such as mean is applied on the filtered distribution to identify the reference value (approximately 65) corresponding to the mean 2004.

Figure 20B:
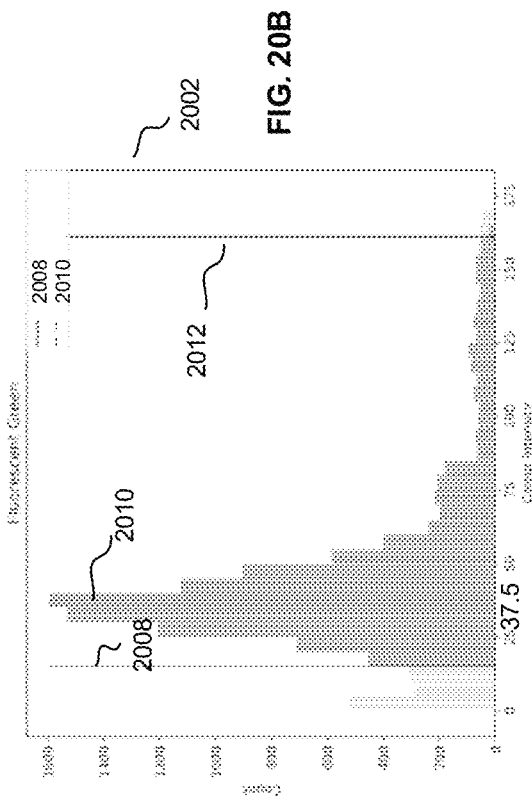
FIG. 20B illustrates determining a reference value for identifying healthy regions according to an embodiment.

FIG. 20B illustrates determining a reference value for identifying healthy regions according to an embodiment. The embodiment illustrates a texture value distribution 2002 as shown by the intensity distribution for a texture component (green channel from the fluorescent data) where the distribution represents histogram plotting number of regions such as facets (represented by counts) with their respective texture component value such as color intensity. A lower threshold 2008 and upper threshold 2012 are used for filtering the distribution, and a mathematical operation such as peak is applied on the filtered distribution to identify the reference value (approximately 37.5) corresponding to the peak 2010.

Figure 21:
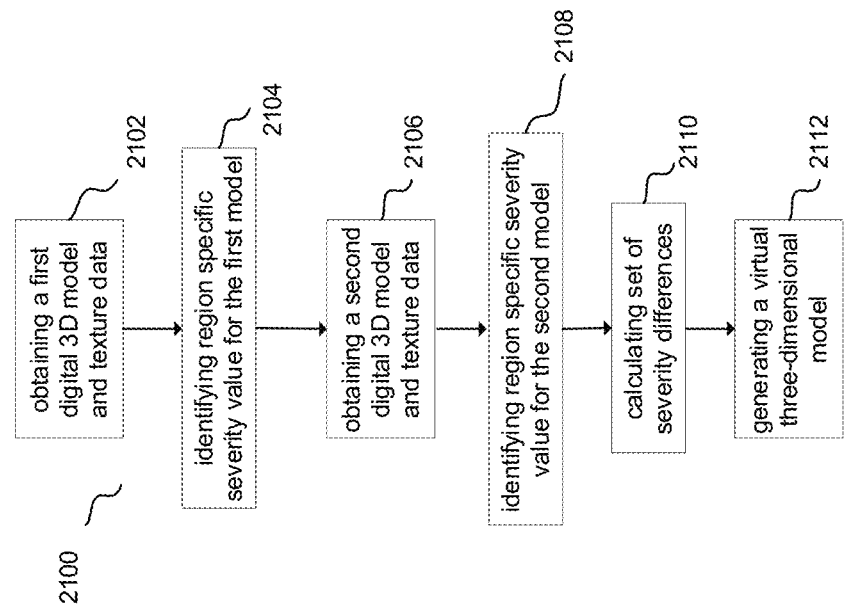
FIG. 21 illustrates method of generating a digital three-dimensional model representing development in dental condition according to an embodiment.

FIG. 21 illustrates method 2100 of generating a digital three-dimensional model representing development in dental condition according to an embodiment. At 2102, at a first time point, a first digital 3D model of a patient's set of teeth and region-specific texture data comprising fluorescence data and color data corresponding to different regions of the first digital 3D model is obtained. At 2104, a severity value, associated with a level of severity of the dental condition, for at least one region identified as a region of the first digital 3D model containing the dental condition is determined by applying a severity function on at least one of the texture data associated with the identified region. At 2106, at a second time point later than the first time point, a second digital 3D model of the patient's set of teeth and region-specific texture data comprising fluorescence data and color data corresponding to different regions of the second digital 3D model is obtained. At 2108, a severity value, associated with a level of severity of the dental condition, for at least one region identified as a region of the first digital 3D model containing the dental condition is determined by applying a severity function on at least one of the texture data associated with the identified region. Thereafter, at 2110, a set of severity differences between the severity values for corresponding regions between the first digital 3D model and the second digital 3D model is calculated. At 2112, a digital 3D model comprising the set of severity differences is generated.

Figure 22:
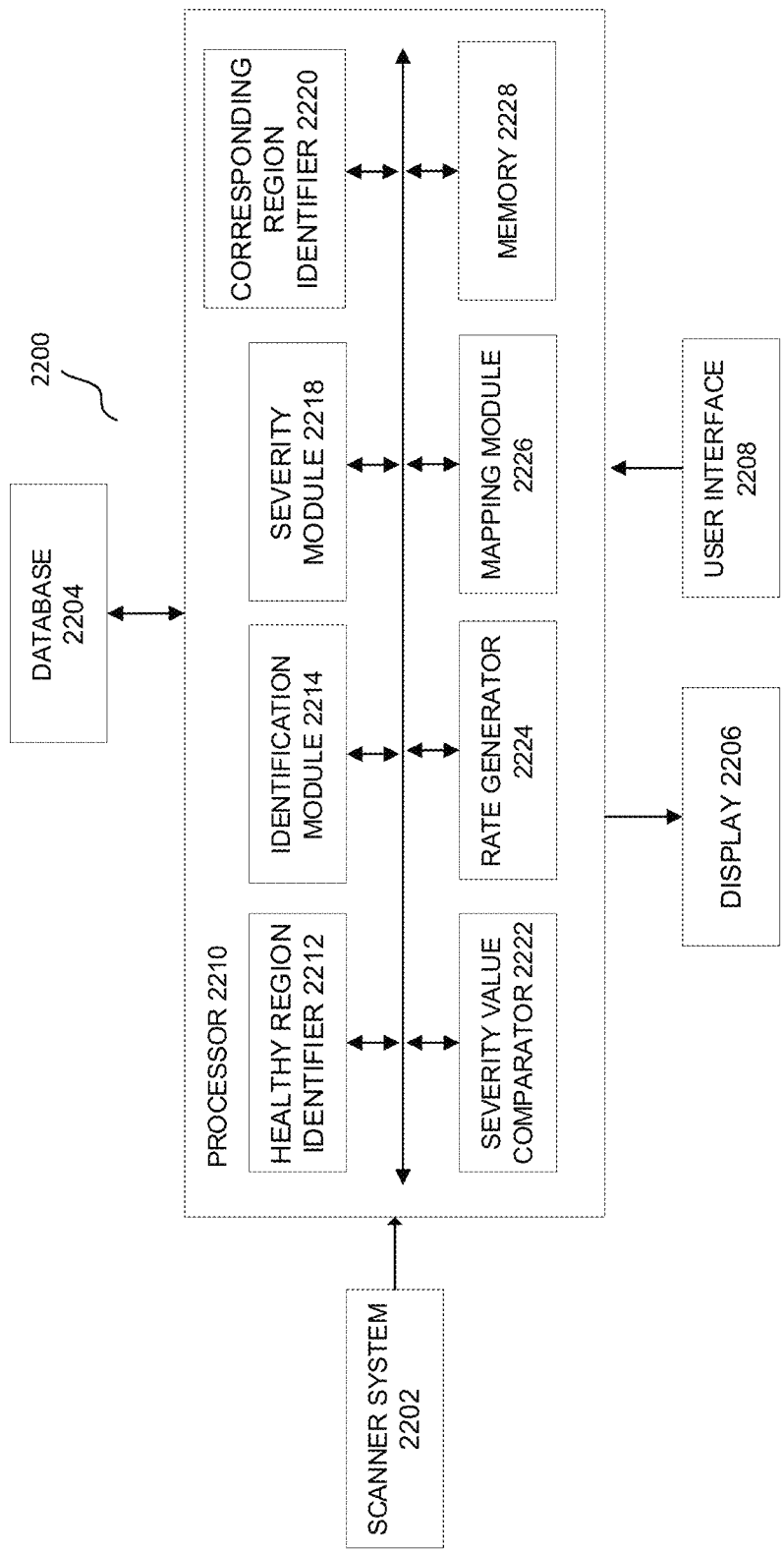
FIG. 22 illustrates a data processing system according to an embodiment.

FIG. 22 illustrates a data processing system according to an embodiment. The system 2200 includes a scanner system 2202 that is configured to generate a first digital 3D model and region-specific texture data corresponding to the first digital 3D model. The scanner system 2202 may also be configured to generate a second digital 3D model and region-specific texture data corresponding to the second digital 3D model. The processor 2210 is configured to receive the first digital 3D model and texture data corresponding to the first model and may also be configured to receive a second digital 3D model and texture data corresponding to the second model. The models with respective texture data may also be received from the scanner system 1302 and/or from a database 2204. The processor 2210 may include one or more of a plurality of means, but not limited to, a healthy region identifier 2212, identification module 2214, severity module 2218, corresponding region identifier 2220, severity value comparator 2222, rate generator 2224, mapping module 2226, and memory 2228.

The healthy region identifier 2212, identification module 2214, severity module 2218, corresponding region identifier 2220, severity value comparator 2222, rate generator 2224, mapping module 2226, and memory 2228. The healthy region identifier is configured to identify a healthy region in the obtained first digital 3D model, the identification comprises identification based on an evaluation of one or more texture components, as obtained from fluorescence data and/or color data. The identification module 2214 is configured to identify a region containing the dental condition based on an identification value satisfying an identification threshold criterion, the identification value being calculated by applying an identification function on the texture data associated with the region of the first digital 3D model. The severity module 2218 is configured to determine a severity value for at least one region identified as the region of the first digital 3D model containing the dental condition by applying a severity function on at least one of the texture data associated with the identified region. The already disclosed module may operate on the second digital 3D model and its corresponding texture data. The severity comparator 2222 is configured to calculate a set of severity differences between the severity values for corresponding regions between the first digital 3D model and the second digital 3D model. The corresponding region identifier 2220 is configured to identify the corresponding regions between the first digital 3D model and the second digital 3D model. The rate generator 2224 is configured to determine the rates of development or velocity function. The mapping module 2226 is configured to map information comprising one or more of severity values, level of severity, set of severity differences, rates of development, or future texture on a digital 3D model. The processor may include additional means for example means for automatically arrange the digital models in a time sequence along a time line, means for receiving user input at a user interface 2208 such as user input at transparency sliders (e.g. 1232 and 1234 in FIG. 12C or 1118 and 1120 in FIG. 11), or color range slider (e.g. 1250 in FIG. 12C or 1126 in FIG. 11), or setting the thresholds for filtering texture values and means for generating different digital 3D models with mapped information. The processor unit is configured to provide the generated 3D models with mapped information on a display unit 2206.

Although some embodiments have been described and shown in detail, the disclosure is not restricted to such details, but may also be embodied in other ways within the scope of the subject matter defined in the following claims. In particular, it is to be understood that other embodiments may be utilized and structural and functional modifications may be made without departing from the scope of the present invention.

A claim may refer to any of the preceding claims, and "any" is understood to mean "any one or more" of the preceding claims.

It should be emphasized that the term "comprises/comprising/including" when used in this specification is taken to specify the presence of stated features, integers, operations, steps or components but does not preclude the presence or addition of one or more other features, integers, steps, components or groups thereof.

In claims enumerating several means, several of these means can be embodied by one and the same item of hardware. The mere fact that certain measures are recited in mutually different dependent claims or described in different embodiments does not indicate that a combination of these measures cannot be used to advantage.

The invention claimed is:

1. A method for generating, via one or more processors, a virtual three-dimensional model representing a dental condition at a region, the method comprising:

obtaining a first digital 3D model of a patient's set of teeth and region-specific texture data corresponding to different regions of the first digital 3D model and storing the texture data in vertices of the first 3D digital model, the texture data comprising fluorescence data and color data;

sampling textured data from one or more vertices to generate a distribution of texture values based on frequency of intensity;

identifying the region containing the dental condition based on an identification value satisfying an identification threshold criterion, the identification value being calculated by applying an identification function on the texture data associated with the region of the first digital 3D model;

determining a severity value for at least one region identified as the region of the first digital 3D model containing the dental condition by applying a severity function on at least one of the texture data associated with the identified region; and generating the virtual three-dimensional model comprising a visual indicator based on the determined severity value for the region containing the dental condition, the virtual three-dimensional model being generated by mapping a region specific severity value or a level of severity onto at least part of the obtained first digital 3D model or a copy thereof.

2. The method according to claim 1, further comprising evaluating one or more texture components, as obtained from fluorescence data and/or color data, to identify a healthy region in the obtained first digital 3D model, wherein the evaluation comprises for at least one texture component of the one of the obtained texture data, determining a reference value based on the distribution of texture values relating to the at least one texture component of the one of the texture data, and identifying regions having respective value of the texture component corresponding to the at least one texture component within a certain range of the determined reference value as the healthy region; or for the one of the obtained texture data, determining a reference value based on the distribution of texture values relating to the one of the obtained texture data, and identifying regions having value of texture within a defined range of the determined reference value as the healthy region.

3. The method according to claim 1, further comprising identifying a healthy region at individual tooth basis, the identification comprises one of identifying the healthy region of the tooth that comprises a region that is inspected for presence of the dental condition and the distribution of texture values relating to the at least one texture component or the one of the obtained texture data is derived from the tooth being inspected for the presence of the dental condition; or identifying the healthy region of a tooth neighboring to the tooth that is inspected for the presence of the dental condition and the distribution of texture values relating to the at least one texture component or the one of the obtained texture data is derived from the neighboring tooth; or identifying the healthy region of a tooth, in the first digital 3D model, that is same tooth type as the tooth that is inspected for presence of the dental condition and the distribution of texture values relating to the at least one texture component or the one of the obtained texture data is derived from the tooth that is same tooth type as the tooth being inspected for the presence of the dental condition.

4. The method according to claim 1, further comprising prior to the determining the reference value, obtaining a filtered texture value distribution by filtering out texture components or texture data having respective texture value outside a defined value range; and determining the reference value based on a distribution of texture value falling within the defined value range.

5. The method according to claim 1, wherein the identification function is based on a distance between the texture data of the region and the texture data of the healthy region in a texture space.

6. The method according to claim 5, wherein the distance comprises an Euclidean distance and the texture components of the texture data represent different dimensions of the texture space.

7. The method according to claim 1, wherein the identification function defines a mathematical relationship comprising at least one texture component of the color data and at least one texture component of the fluorescence data from the region, and at least one texture component of the color data and at least one texture component of the fluorescence data from the healthy region.

8. The method according to claim 1, wherein at least one texture component of the fluorescence data from the region and/or healthy region in the identification function comprises only at least one of red texture component or green texture component.

9. The method according to claim 1, wherein the identification function is devoid of blue texture component of the fluorescence data.

10. The method according to claim 1, wherein the identification function is expressed as $$IV = \sqrt{\begin{array}{l}(r_{fluo,h} - r_{fluo})^2 + (g_{fluo,h} - g_{fluo})^2 + \\ (r_h - r)^2 + (g_h - g)^2 + (b_h - b)^2\end{array}},$$

where IV is identification value, $r_{fluo,h}$ and $g_{fluo,h}$ are respective values of red and green texture components of the fluorescence data from the healthy region, $r_{fluo}$ and $g_{fluo}$ are respective values of red and green texture components of the fluorescence data from the region, $r_h$, $g_h$, and $b_n$ are respective values of red, green, and blue texture components of the color data from the healthy region, r, g, and b are respective values of red, green, and blue texture components of the color data from the region.

11. The method according to claim 1, wherein the identification function is expressed as $$IV = \sqrt{(g_{fluo,h} - g_{fluo})^2 + (r_h - r)^2 + (g_h - g)^2 + (b_h - b)^2}.$$

where IV is identification value, $g_{fluo,h}$ is value of green texture component of the fluorescence data from the healthy region, $g_{fluo}$ is value of green texture component of the fluorescence data from the region, $r_h$, $g_h$, and $b_h$ are respective values of red, green, and blue texture components of the color data from the healthy region, r, g, and b are respective values of red, green, and blue texture components of the color data from the region.

12. The method according to claim 1, wherein the severity function defines a mathematical relationship comprising a texture component of the fluorescence data from the region and same texture component of the fluorescence data from the healthy region.

13. The method according to claim 1, wherein the severity function is expressed as $$SV = \frac{g_{fluo}}{g_{fluo,h}}$$

where SV is the severity value, $g_{fluo,h}$ is value of green texture component of the fluorescence data from the healthy region, $g_{fluo}$ is value of green texture component of the fluorescence data from the region.

14. The method according to claim 1, wherein applying the identification function comprises using, in the identification function, texture component value(s) from the region and healthy region, and applying the severity function comprises using, in the severity function, texture component value(s) from the region and healthy region.

15. The method according to claim 1, further comprising determining a level of severity of the dental condition based on the determined severity value satisfying a severity threshold criterion.

16. The method according to claim 1, wherein the first digital 3d model or a copy thereof comprising the mapped severity value or mapped level of severity includes the at least one of the texture data or is devoid of any of the texture data relating to the first digital 3D model.

17. The method according to claim 1, further comprising obtaining a second digital 3D model of a patient's set of teeth and region-specific texture data comprising fluorescence data and color data corresponding to different regions of the second digital 3D model, the second digital 3D model and region-specific texture data being obtained at a second time point different than a time point at which the first digital 3D model and region-specific texture data corresponding to different regions of the first digital 3D model was obtained.

18. The method according to claim 1, further comprising
identifying a region containing the dental condition based on an identification value satisfying an identification threshold criterion, the identification value being calculated by applying the identification function on the texture data associated with the region of the second digital 3D model; and
determining a severity value by applying the severity function on at least one of the data comprised in the texture data associated with the region identified as the region of the second digital 3D model containing the dental condition.

19. The method according to claim 1, further comprising
calculating a set of severity differences between the severity values for corresponding regions between the first digital 3D model and the second digital 3D model; and
generating a digital 3D model comprising the set of severity differences.

20. The method according to claim 19, wherein the generating digital 3D model comprising the set of severity differences comprises
mapping region specific severity difference or onto at least a part of the obtained first digital 3d model or a copy thereof, the first digital 3d model or a copy thereof comprising the set of severity differences includes the at least one of the texture data or is devoid of any of the texture data relating to the first digital 3D model, or
mapping region specific severity difference onto at least a part of the obtained second digital 3d model or a copy thereof, the second digital 3d model or a copy thereof comprising the set of severity differences includes the at least one of the texture data or is devoid of any of the texture data relating to the second digital 3D model.

21. The method according to claim 1, further comprising:
generating a histogram from the sampling textured data.

22. The method according to claim 1, wherein:
the frequency of intensity is a frequency of intensity across the two or more vertices.

* * * * *